United States Patent [19]
Miller

[11] 3,912,723
[45] Oct. 14, 1975

[54] 2-PHENYL-AS-TRIAZINE-3,5(2H,4H)DIONES

[75] Inventor: Max W. Miller, Stonington, Conn.

[73] Assignee: Pfizer Inc., New York, N.Y.

[22] Filed: July 20, 1973

[21] Appl. No.: 381,062

Related U.S. Application Data

[63] Continuation-in-part of Ser. No. 129,139, March 29, 1971, abandoned, which is a continuation-in-part of Ser. No. 78,917, Oct. 7, 1970, abandoned, which is a continuation-in-part of Ser. No. 768,191, Oct. 16, 1968, abandoned.

[52] U.S. Cl.. 260/239.7; 260/248 AS; 260/247.5 C; 260/243 B; 424/249
[51] Int. Cl.² .................................... C07D 253/06
[58] Field of Search......... 260/248 AS, 239.7, 239.6, 260/239.8, 239.9, 239.95, 247.5 C, 243 B, 247.1

[56] References Cited
UNITED STATES PATENTS
3,560,496  2/1971  Howes et al. ....................... 260/248

*Primary Examiner*—John M. Ford
*Attorney, Agent, or Firm*—Connolly and Hutz

[57] ABSTRACT

2-Phenyl-as-triazine-3,5(2H,4H) diones and novel 2-substituted-phenyl-as-triazine-3,5(2H,4H) diones and their use as agents for the control of coccidiosis are described.

21 Claims, No Drawings

2-PHENYL-AS-TRIAZINE-3,5(2H,4H)DIONES

CROSS-REFERENCE TO RELATED APPLICATIONS

This application is a continuation-in-part of copending application Ser. No. 129,139, filed Mar. 29, 1971, which in turn is a continuation-in-part of application Ser. No. 78,917, filed Oct. 7, 1970, which in turn is a continuation-in-part of application Ser. No. 768,191, filed Oct. 16, 1968, all three now abandoned.

BACKGROUND OF THE INVENTION

Coccidiosis, a protozoan infection in young poultry, is known to have far-reaching economic effects. It is characterized by intestinal disorders, anemia, hemorrhage, and general unthriftiness. Two types of coccidiosis are known — the first, cecal, is caused by the coccidium *Eimeria tenella* and is characterized by severe hemorrhage on or about the fifth day after infection. The second type, intestinal, is caused by various species of *Eimeria*, namely, the *E. acervulina*, *E. necatrix*, *E. maxima*, *E. hagani*, *E. mitis*, *E. praecox*, and *E. brunetti*.

Extensive investigations into methods for controlling coccidiosis have led to the development of a wide variety of structural types of compounds such as sulfur, sulfa drugs, arsenicals, dihydro-1,3,5-triazines (U.S. Pat. No. 2,823,161); 3-amino-as-triazine complexes with substituted ureas (U.S. Pat. No. 2,731,385); 1-phenyl-3-(3-as-triazinyl) ureas (U.S. Pat. No. 2,762,743); 5-fluorouracil (U.S. Pat. No. 3,017,322); and as-triazine-3,5(2H,4H) dione (U.S. Pat. No. 2,956,924) as coccidiostats.

The available agents are not completely satisfactory for control of coccidiosis for one or more reasons. Many of these agents are relatively toxic and/or exhibit a low order of activity or possess a rather limited anticoccidial spectrum. Their effectiveness in suppressing or preventing the disease is frequently not high, and the high dosage levels required place an undue economic burden on the poultry grower.

SUMMARY OF THE INVENTION

It has now been found that a series of 2-phenyl-as-triazine-3,5-(2H,4H) diones having the general formula:

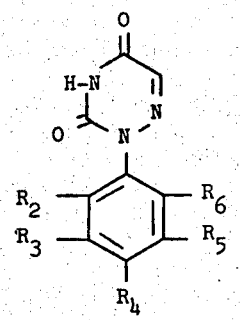

I and the alkali metal and alkaline earth metal salts thereof wherein each of $R_2$ and $R_6$ is selected from the group consisting of hydrogen, fluoro, chloro, cyano and methyl, with the proviso that at least one of $R_2$ and $R_6$ is hydrogen or fluoro;

each of $R_3$ and $R_5$ is selected from the group consisting of a first sub-group consisting of hydrogen, cyano, trifluoromethyl, halogen and lower alkyl; a second sub-group consisting of lower alkoxy and lower alkylthio; a third sub-group consisting of nitro and thiocyanato;

$R_4$ is selected from the group consisting of $R_3$ and a fourth sub-group consisting of $NR_7R_8$, alkyl sulfonyl, $SO_2NRR_1$,

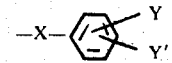

and lower alkanoyl; with the provisos that when $R_4$ is $SO_2NRR_1$ or alkanoyl, at least one of $R_3$ and $R_5$ is other than hydrogen; and when at least one of $R_3$ and $R_5$ is selected from the second sub-group, $R_4$ is selected from the first, third or fourth sub-groups;

R is selected from the group consisting of methyl, ethyl, phenyl, allyl, propargyl, benzyl and p-chlorophenyl; $R_1$ is selected from the group consisting of methyl, ethyl, allyl and propargyl; R and $R_1$ when taken together with the nitrogen to which they are attached are selected from the group consisting of morpholino, thiomorpholino, pyrrolo, pyrrolino, pyrrolidino, piperazino, piperidino, N-(lower alkyl)-piperazino, hexamethyleneimino, 3,4-dichloropiperidino, thiazolidino and $\Delta^3$-tetrahydropyridino;

each of $R_7$ and $R_8$ is lower alkyl of from 1 to 4 carbon atoms; $R_7$ and $R_8$ when taken together with the nirogen atom to which they are attached are selected from the group consisting of morpholino, thiomorpholino, pyrrolo, pyrrolino, pyrrolidino, piperidino, N-(lower alky)piperazino, hexamethyleneimino, thiazolidino, $\Delta^3$-tetrahydropyridino and piperazino;

X is selected from the group consisting of oxygen, sulfur, $>C=O$, $-NH$, $-S \rightarrow O$, $-SO_2-$ and $-CHOH-$;

each of Y and Y' is selected from the group consisting of hydrogen, nitro, cyano, halogen, lower alkyl and lower alkoxy; provided that when $R_3$ or $R_5$ is methyl or chloro and X is sulfur, $-SO_2-$, or $>C=0$, then $R_4$ is other than

are highly effective in controlling coccidiosis when orally administered in small doses to poultry. The terms "control" and "controlling" — as used herein — are intended to include the treatment, that is, the alleviation of symptoms of established coccidial infections of poultry, as well as the prevention (prophylaxis) of infection. However, because of the rapid cylinical course of coccidial infections, the principal interest in these compounds resides in their use for the prevention of such infections.

The terms "lower alkyl" and "lower alkoxy" — as used herein — are intended to include alkyl and alkoxy groups having from 1 to 6 carbon atoms.

Of the variety of isomeric, homologous and analogous phenyl-as-triazine-3,5(2H,4H) diones described in the art, it is the herein described 2-phenyl-as-triazine-3,5(2H,4H) diones that are especially effective as agents for the control of coccidiosis. The isomeric 4- and 6-phenyl-as-triazine-3,5(2H,4H) diones are less effective as coccidiostats than are the 2-phenyl derivatives of the above formula.

The compounds described herein may be administered to the poultry alone but are preferably administered in conjunction with a suitable inert carrier such as a nutritionally-balanced pountry feed. Although the preferred route of administration is the oral route, it is also possible to administer these coccidiostatic compounds via the rectum. The compounds can, of course, as those skilled in the art will recognize, also be administered via the drinking water.

DETAILED DESCRIPTION OF THE INVENTION

The 2-phenyl-as-triazine-3,5(2H,4H) diones described herein are prepared by methods such as are described by Slouka, Monatsh. Chem. 96, 134–137 (1965), which comprises decarboxylation of the corresponding 6-carboxy derivatives. The requisite 6-carboxy acid derivatives are obtained by acid hydrolysis of the corresponding cyano compounds which are, in turn, prepared according to the procedure of Slouka, Monatsh. Chem. 94, 258–262 (1963). This method comprises reaction of the appropriate phenyl diazonium salt with cyanoacetylurethan to provide the corresponding phenylhydrazono-cyanoacetylurethan which, under the influence of alkali or sodium acetate-acetic acid or ammonium acetate-acetic acid, produces the 6-cyano compound which is hydrolyzed to the carboxy acid under acid or alkaline conditions.

The 2-phenyl-as-triazine-3,5(2H,4H) diones described herein which contain activating groups such as the 2-(4-nitrophenyl) compounds are also prepared by direct phenylation of the parent compound as-triazine-3,5(2H,4H) dione, known trivially as 6-azauracil. The general procedure comprises treatment of as-triazine-3,5(2H,4H) dione in a suitable solvent system in the presence of an acid acceptor with the appropriate halobenzene such as 4-nitrofluorobenzene. Suitable solvents are water, ethylene glycol, N,N-dimethylformamide, dimethylsulfoxide and lower alkanols.

The molar proportion of reactants is not critical but can range from equimolar proportions up to a large excess of either reactant. In general, molar proportions of as-triazine-3,5(2H,4H) dione to halobenzene compound of from about 1:1 to about 1:2.0 are satisfactory.

The reaction temperature is not critical. In general, temperatures ranging from ambient temperature up to about 60°C. are favored. Higher temperatures or lower temperatures can, of course, be used but appear to offer no advantages. The reaction is generally conducted over a period of from about 2 to about 8 hours. Upon completion of the reaction, the reaction mixture is decolorized, if necessary; acidified to a pH of from about 3 to about 5; and cooled to precipitate the product. The product thus obtained is purified by methods known to those skilled in the art as, for example, by recrystallization from appropriate solvents, by chromatography on a suitable adsorbent, or by a combination of these methods.

The necessary reactants, that is, the appropriately substituted anilines of the formula

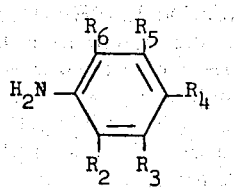

II wherein the R variables are as defined above which are converted to a diazonium salt and reacted with cyanoacetylurethan as described above, if not commercially available, are accessible by methods known to those skilled in the art. A number of alternative routes to the final products of formula I are frequently at one's disposal. To illustrate: compounds of formula I wherein $R_4$ is

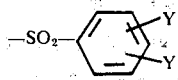

(the other R variables having the values given above) can be prepared as described herein (Slouka, loc. cit.) from formula II reactants wherein $R_4$ is

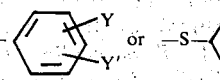

The use of the former reactant, of course, produces the desired compound of formula I. The latter reactant produces a thio derivative which is subsequently oxidized to the desired sulfonyl analog according to known methods; e.g., via hydrogen peroxide.

Those compounds of formula I wherein $R_4$ is

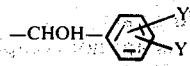

are prepared by reduction of the corresponding ketone derivatives

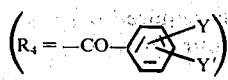

Sodium borohydride is an efficient reducing agent for the reduction of ketones of formula I wherein at least one of $R_3$ or $R_5$ is hydrogen. Ketone precursors in which each of $R_3$ and $R_5$ is other than hydrogen are reduced in similar fashion but using excess, three to four times, sodium borohydride and elevated temperatures, i.e., reflux.

The present agents may be orally administered to poultry in a suitable carrier therefor. It is generally convenient and, therefore, preferred to add the agents to the poultry feed so that a therapeutic dosage of the agent is ingested with the daily poultry ration. The agent may be added directly to the feed, as such, or in the form of a premix or concentrate. A premix or concentrate of therapeutic agent in a carrier is commonly employed for the inclusion of the agent in the feed. Suitable carriers are liquid or solid, as desired, such as water, various meals; for example, soybean oil meal, linseed oil meal, corncob meal, and mineral mixes such as are commonly employed in poultry feeds. A particularly effective carrier is the poultry feed itself; that is, a small portion of poultry feed. The carrier facilitates uniform distribution of the active materials in the finished feed with which the premix is blended. This is important because only small portions of the present potent agents are required. It is important that the compound be thoroughly blended into the premix and, subsequently, the feed. In this respect, the agent may be dispersed or dissolved in a suitable oily vehicle such as soybean oil, corn oil, cottonseed oil, and the like, or in a volatile organic solvent and then blended with the carrier. It will be appreciated that the proportionss of active material in the concentrate are capable of wide variation since the amount of agent in the finished feed may be adjusted by blending the appropriate proportion of premix with the feed to obtain a desired level of therapeutic agent.

High potency concentrates may be blended by the feed manufacturer with proteinaceous carriers such as soybean oil meal and other meals, as described above, to produce concentrated supplements which are suitable for direct feeding to poultry. In such instances, the poultry is permitted to consume the usual diet. Alternatively, such concentrated supplements may be added directly to the poultry feed to produce a nutritionally-balanced, finished feed containing a therapeutically-effective level of one or more of the compounds of this invention. The mixtures are thoroughly blended by standard procedures, such as in a twin-shell belender, to ensure homogeneity. The finished poultry feed should contain roughly between 50 percent and 80 percent of grains, between 0 percent and 10 percent animal protein, between 5 percent and 30 percent vegetable protein, between 2 percent and 4 percent minerals, together with supplemental vitaminaceous sources.

It will, of course, be obvious to those skilled in the art that the use levels of the compounds described herein will vary under different circumstances. Continuous low-level medication during the growing period, that is, during the first 8 to 12 weeks for chickens, is an effective prophylactic measure. In the treatment of established infections, higher levels may be necessary to overcome the infection.

The present compounds may be employed at substantially low levels in feeds for the prevention or treatment of coccidiosis. Generally, the feed compositions of the present invention comprise a minor amount of the 2-phenyl-as-triazine compounds of this invention and a major amount of a nutritionally balanced feed, as described above. Feed compositions containing as little as 0.0015 percent of the present agent are found to effectively combat coccidiosis. Large amounts of the agent, up to 0.1 percent and larger, may also be employed. Of course, concentrations of less than 0.0015 percent provide some control of the infections. The concentration range favored in feed compositions is from about 0.0015 percent to about 0.05 percent. The preferred range is from about 0.0015 percent to about 0.025 percent of the ration. When administered by incorporation into the drinking water, preferably as an alkali metal or alkaline earth metal salt, the herein-described compounds are used at levels one-half the dosage given above for feeds.

The present feed compositions and supplements may also contain other effective therapeutic agents, such as antiobiotics, to promote growth and general health of the poultry; arsenicals, e.g., 4-hydroxy-3-nitrophenylarsonic acid, as a growth stimulant; as well as sulfa compounds which may increase the effectiveness of the present coccidiostats.

Additionally, compounds of the above formula wherein at least one of $R_3$, $R_4$ or $R_5$ is alkenyl or alkynyl; compounds wherein $R_4$ is $-NHCH_2CH_2N(CH_3)_2$ or $-N(lower\ alkyl)-CH_2CH_2N(CH_3)_2$; and compounds wherein at least one of the $R_3$ and $R_5$ is an alkanoyl or bulky substituent such as (lower alkyl)-sulfonyl, $SO_2NRR_1$ and

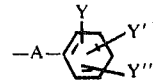

wherein A is $-CR'=CR'-$, $CH_2$, $-CF_2-$ and X; R, $R_1$, X, Y and Y' are as defined herein; Y'' is selected from the same values as is Y; and R' is hydrogen and lower alkyl; are valuable agents for the prevention of coccidial infections. Also effective as coccidiostats are compounds of the formula I wherein $R_4$ is

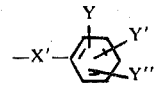

and wherein X' is $-CHOH-$, $-CR'=CR'-$, $-CH_2-$ and $CF_2-$; and X, Y, Y' and Y'' are as defined herein; cycloalkanoyl of from 4 to 8 carbon atoms, alkanoyl of from 7 to 9 carbon atoms, $SO_2NR'R''$ wherein R' is hydrogen or lower alkyl; and R'' is alicyclic of 3 to 7 carbon atoms, substituted phenyl or substituted benzyl wherein the substitutent is at least one of lower alkyl, lower alkoxy, halogen, nitro, cyano and trifluoromethyl; as well as the three thione analogs of the herein disclosed compounds. Such compounds are prepared from appropriate reactants by methods described herein.

EXAMPLE I 2-(3,4-Dichlorophenyl)-as-Triazine-3,5(2H,4H) Dione

A. 3,4-Dichlorophenyl diazonium chloride

A 600 ml. beaker is charged with 3,4-dichloroaniline (40.6 g.) and water (30 ml.) and heated until the 3,4-dichloroaniline melts. Concentrated hydrochloric acid (50 ml.) is then added, the resulting solid slurried by addition of water (200 ml.) and cooled to 5°C. A solution of sodium nitrite (18 g. in 36 ml. of water) is added dropwise while keeping the stem of the dropping funnel below the surface of the liquid. The addition of the sodium nitrite solution is continued until a positive test with potassium iodide test paper is obtained.

B. 3,4-Dichlorophenylhydrazono-cyanoacetylurethan

The resulting greenish colored slurry of the diazonium chloride salt is then added dropwise to a stirred solution of cyanoacetylurethan (22,9 g.) in water (3240 ml.) containing pyridine (108 ml.) and cracked ice (1080 g.). The temperature is held at about 0°C. during the addition and the reaction mixture stirred for fifteen minutes following completion of addition. The orange precipitate which forms is removed by filtration, washed with water and dried.

A second batch of 3,4-dichlorophenylhydrazono-cyanoacetylurethan, similarly prepared, is combined with the first batch and the combined product recrystallized from acetonitrile and dried.

Yield = 60 percent; m.p. = 199°–201°C.

Analysis: Calc'd. for $C_{12}H_{10}O_3N_4Cl_2$: C, 43.78; H, 3.06; N, 17.02 percent Found: C, 43.67; H, 3.09; N, 16.92 percent.

C. 2-(3,4-Dichlorophenyl)-as-triazine-3,5(2H,4H) dione 6-carboxylic acid

To a solution of potassium hydroxide (600 ml. of 1N) in a 2-liter round-bottom flask fitted with a stirrer and condenser is added 3,4-dichlorophenylhydrazonocyanoacetylurethan (49 g.). The suspension is refluxed for 2.5 hours, then cooled and filtered. The filtrate is acidified to pH 2, the resulting solid filtered off, slurried in saturated sodium bicarbonate solution (600 ml.) and filtered. The filtrate is acidified to pH 2, the resulting solid (a monohydrate) filtered off, dried and recrystallized from methylisobutyl ketone, then from acetic acid-water; m.p. = 214°–215°C. Additional product is recovered from the acidified filtrate by evaporation.

Analysis: Calc'd. for $C_{10}H_5O_4N_3Cl_2H_2O$: C, 37.52; H, 2.21; N, 13.13 percent Found: C, 37.87; H, 2.09; N, 13.14 percent The 2-(3,4-dichlorophenyl)-as-triazine-3,5(2H,4H) dione 6-carboxylic acid is decarboxylated by heating to 270°C. for 30 minutes in a round-bottom flask fitted with a condenser and immersed in a Wood's metal bath.

The melt was then cooled and recrystallized from ethanol: m.p. = 225°–226°C.

Analysis: Calc'd. for $C_9H_5O_2N_3Cl_2$: C, 41.89; H, 1.95; N, 16.28 percent Found: C, 41.90; H, 2.00; N, 16.14 percent As an alternative to method C, the cyclization and hydrolysis steps are accomplished as follows:

To a solution of acetic acid (40 ml.) is added sodium acetate (1.6 g.) and 3,4-dichlorophenylhydrazonocyanoacetylurethan (5.1 g.). The mixture is heated at 115°C. for 5 hours, then cooled and slowly poured into water (400 ml.). The resulting suspension is stirred for one-half hour, then filtered, the filter cake washed with water and dried. The product, 2-(3,4-dichlorophenyl)-6-cyano-as-triazine-3,5(2H,4H) dione, is recrystallized from acetonitrile.

The nitrile is added to a 1:1 mixture of acetic acid-concentrated hydrochloric acid (11 ml. per mM of nitrile) and the mixture refluxed for sixteen hours. It is cooled to room temperature, the product filtered, washed with water and dried.

The carboxy acid thus produced is decarboxylated as described above.

The following compounds are similarly prepared from appropriate reactants produced according to known procedures, many of which are described herein.

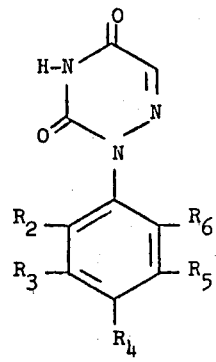

| $R_2$ | $R_3$ | $R_4$ | $R_5$ | $R_6$ | M.P. (°C.) | MEC* |
|---|---|---|---|---|---|---|
| H | H | H | H | H | 209–10 | 0.0500 |
| CN | H | H | H | H | 187–9 | ~0.05 |
| H | CF₃ | H | H | H | 125–6 | 0.0030 |
| H | Cl | H | H | H | 212–4 | 0.0125 |
| H | H | Cl | H | H | 231–3 | 0.0125 |
| H | Br | H | H | H | 206–8 | ~0.0125 |
| H | H | Br | H | H | 246–8 | 0.0250 |
| H | SCH₃ | H | H | H | 134–6 | >0.0250 |
| H | H | SO₂—CH₃ | H | H | 249 | >0.0250 |
| H | Cl | SO₂—CH₃ | Cl | H | 237 | >0.0125 |
| H | CH₃ | OCH₃ | CH₃ | H | 164–6 | |
| H | F | H | H | H | 239–40 | >0.0250 |
| H | H | F | H | H | 273–4 | >0.0125 |
| H | I | H | H | H | 200–2 | ~0.0250 |
| H | H | I | H | H | 277–9 | >0.0250 |
| H | CN | H | H | H | 197–8 | ~0.0030 |
| H | H | CN | H | H | 295–7 | ~0.0030 |
| H | Cl | CH₃ | H | H | 229 | > 0.0060 |
| H | CH₃ | CH₃ | H | H | 145–7 | >0.0125 |
| H | CF₃— | CN³ | H | H | 106–5 | 0.0015–0.0030 |
| H | I | CH₃ | H | H | 182–3 | >0.0125 |
| H | CN | CH₃ | H | H | 251–5 | >0.0030 |
| H | Cl | H | CH₃ | H | 179.5–180.5 | 0.002 |
| H | NO₂ | H | CH₃ | H | 205–10 | >0.0060 |
| H | I | H | CH₃ | H | 187 | ~0.0060 |
| H | CN | H | CH₃ | H | 218–20 | ~0.0030 |
| H | Br | H | CH₃ | H | 183–6 | 0.0015 |
| H | Cl | H | Cl | H | 168–9 | 0.0004 |
| H | CF₃Cl | H | H | 51–3 | | 0.0008 |
| H | CF₃ | F | H | H | 141–3 | 0.0015 |
| H | CF₃ | Br | H | H | 145–6 | 0.0015 |
| H | CF₃ | H | CF₃ | H | 173–5 | 0.0015–0.0030 |

-Continued

| $R_2$ | $R_3$ | $R_4$ | $R_5$ | $R_6$ | M.P. (°C.) | MEC* |
|---|---|---|---|---|---|---|
| H | Cl | Cl | H | H | 225-6 | 0.0060 |
| Cl | H | H | Cl | H | 184-6 | >0.0060 |
| H | CH_3 | H | CH_3 | H | 168 | 0.0030-0.0060 |
| F | F | Br | F | F | 176-8 | 0.0060 |
| H | NO_2 | H | NO_2 | H | 242-50 | >0.0008 |
| H | CH_3 | Cl | H | H | 210-2 | >0.0060 |
| Cl | Cl | H | H | H | 213-5 | ~0.0500 |
| H | OCH_3 | H | OCH_3 | H | 205-6 | ~0.0500 |
| H | CH_3 | F | H | H | 177-9 | 0.0250 |
| H | CF_3 | H | CH_3 | H | 185-7 | 0.0060 |
| H | F | H | CH_3 | H | 182-4 | 0.0125 |
| H | H | NO_2 | H | H | 221 | 0.0250 |
| H | Cl | OCH_3 | Cl | H | 180-2 | 0.0250 |
| H | Cl | CH_3 | Cl | H | 194-6 | 0.0030 |
| H | Cl | Cl | Cl | H | 215-20 | 0.0004 |
| H | Cl | Cl | CH_3 | H | 206-8 | 0.0030 |
| H | CH_3 | Cl | CH_3 | H | 190-5 | 0.0060 |
| H | Cl | Br | CH_3 | H | 214-5 | 0.0060 |
| H | Br | CH_3 | CH_3 | H | 212 | >0.0060 |
| H | Cl | O—(4-ClC_6H_4) | H | H | 189-91 | 0.0015 |
| H | Cl | O—(3-FC_6H_4) | H | H | 167-8 | ~0.0125 |
| H | Cl | O—(4-CH_3OC_6H_4) | H | H | 190-1 | ~0.0125 |
| H | Cl | O—(3-CH_3C_6H_4) | H | H | 148-9 | ~0.0025 |
| H | Cl | O—(3-ClC_6H_4) | H | H | 156-7 | 0.0125-0.025 |
| H | Cl | O—(4-CH_3C_6H_4) | H | H | 187-8 | >0.0125 |
| H | CH_3 | SO_2N(C_2H_5)_2 | Cl | H | 183-4 | ~0.0125 |
| H | CH_3 | SO_2(morpholino) | Cl | H | 168-70 | 0.0008-0.0015 |
| H | CH_3 | SO_2(pyrrolino) | Cl | H | 202-4 | 0.006 |
| H | CH_3 | SO_2N(CH_3)_2 | Cl | H | 233-4 | 0.006 |
| H | CH_3 | SO_2(thiomorpholino) | Cl | H | 178-80 | 0.0120 |
| H | CH_3 | SO_2(thiazolidino) | Cl | H | 199-200 | >0.0120 |
| H | Cl | SO_2(morpholino) | H | H | 227-9 | 0.0030 |
| H | Cl | SO_2—N(C_2H_5)_2 | H | H | 278-80 | >0.0250 |
| H | Cl | SO_2(pyrrolidino) | H | H | 225 | 0.0250 |
| H | Cl | SO_2(thiomorpholino) | H | H | 216-7 | 0.0060 |
| H | Cl | SO_2(pyrrolino) | H | H | 227-8 | 0.0125 |
| H | Cl | SO_2(thiazolidino) | H | H | 207-8 | >0.0120 |
| H | Cl | SO_2—N(CH_3)C_2H_5 | H | H | 180 | >0.0125 |
| H | Cl | SO_2—N(CH_3)_2 | H | H | 214 | 0.0060 |
| H | CH_3 | SO_2(pyrrolidino) | H | H | 216-20 | >0.0125 |
| H | CH_3 | SO_2(pyrrolino) | CH_3 | H | 196-8 | 0.0060 |
| H | CH_3 | SO_2N(CH_3)_2 | CH_3 | H | 232-4 | 0.0060 |
| H | CH_3 | SO_2N(C_2H_5)_2 | H | H | 188 | 0.0125 |
| H | H | SO_2(p-tolyl) | H | H | 295 | 0.0250 |
| H | H | SO_2(4-t-C_4H_9C_6H_4) | H | H | 321-5 | >0.0250 |
| H | H | SO_2(4-BrC_6H_4) | H | H | >300 | 0.0008 |
| H | OCH_3 | SO_2(4-BrC_6H_4) | H | H | 250-1 | 0.0008 |
| H | H | CO—(P-tolyl) | H | H | 241-3 | >0.0250 |
| H | Cl | OC_2H_5 | Cl | H | 186-91 | 0.0060 |
| H | H | SO_2—(4-NO_2C_6H_4) | H | H | 230-5 | >0.0250 |
| H | H | 4—NO_2C_6H_4S | H | H | 186-8 | 0.0030 |
| H | Cl | O—(i-C_3H_7) | Cl | H | 176-85 | >0.0250 |
| H | H | CO—(4-CH_3OC_6H_4) | H | H | 247-8 | 0.0125 |
| H | CH_3 | CO— C_6H_5 | H | H | 197-9 | 0.008-0.0015 |
| H | Cl | CO—C_6H_5 | H | H | 180-4 | 0.0015-0.0030 |
| H | Cl | O—(n-C_3H_7) | Cl | H | 180-5 | >0.0250 |
| H | Cl | O—(n-C_4H_9) | Cl | H | 161-4 | 0.0030 |
| H | CH_3 | O—C_6H_5 | H | H | 145-7 | >0.006 |
| H | CH_3 | O—(4-ClC_6H_4) | H | H | 164-5 | ≤0.0015 |
| H | Cl | O—(2-ClC_6H_4) | H | H | 131-4 | ≥0.0060 |
| H | Cl | O—C_6H_5 | H | H | 160 | >0.0125 |
| H | CH_3 | CO—(2-ClC_6H_4) | H | H | 147-50 | |
| H | CH_3 | CO—(4-CNC_6H_4) | H | H | 100 | ≤0.006 |
| H | CH_3 | O—(2-ClC_6H_4) | H | H | 148-50 | ≤0.006 |
| H | Cl | O—(3,5-Cl_2C_6H_3) | H | H | 130-3 | ~0.003 |
| H | Cl | O—(3,4-Cl_2C_6H_3) | H | H | 173-4 | 0.006 |
| H | Cl | O—(3-CH_3-4-ClC_6H_3) | H | H | 187-9 | 0.025 |
| H | CH_3 | O—(3,4-Cl_2C_6H_3) | H | H | 284-6 | |
| H | Cl | O—(4-Cl-3,5-(CH_3)_2C_6H_2) | H | H | 220-1 | 0.012 |
| H | CH_3 | O—(2,4-Cl_2C_6H_3) | H | H | 177-8 | 0.00075 |
| H | Cl | O—(2,4-Cl_2C_6H_3) | H | H | 153-5 | ~0.00075 |
| H | Cl | O—(2-CH_3-4-ClC_6H_3) | H | H | 166-7 | 0.0015 |
| H | CH_3 | O—(2-CH_3-4-ClC_6H_3) | H | H | 166-8 | 0.006 |
| H | Cl | O—(4-ClC_6H_4) | Cl | H | 120-1 | ≤0.00019 |
| H | Cl | O—(4-FC_6H_4) | H | H | 183-5 | 0.006 |
| H | Cl | O—(4-ClC_6H_4) | CH_3 | H | 182-3 | ≤0.00038 |
| H | CF_3 | O—(4-ClC_6H_4) | H | H | 183-4 | 0.006 |
| H | CH_3 | O—(4-FC_6H_4) | H | H | 150-2 | 0.012 |
| H | CF_3 | O—(2-CH_3-4-ClC_6H_3) | H | H | 127-9 | 0.0125 |
| H | CH_3 | O—(4-ClC_6H_4) | CH_3 | H | 177-9 | 0.0008 |
| H | NO_2 | O—(4-Cl-C_6H_4) | H | H | 188-9 | 0.0015 |
| H | NO_2 | O—(2-CH_3-4-ClC_6H_3) | H | H | 171-3 | 0.0030 |
| H | Cl | O—(4-FC_6H_4) | H | H | 203-4 | 0.006 |
| H | Cl | O—(4-IC_6H_4) | H | H | 218-20 | ~0.0015 |
| H | CH_3 | SO_2—(morpholino) | Cl | H | 168-70 | 0.0015 |
| H | H | SO_2—C_6H_5 | H | H | 300-5 | 0.0030 |
| H | CH_3 | SO_2—(4-BrC_6H_4) | H | H | 250-1 | 0.0015 |
| H | H | SO_2—(o-tolyl) | H | H | 268-70 | >0.0125 |

| $R_2$ | $R_3$ | $R_4$ | $R_5$ | $R_6$ | M.P. (°C.) | MEC* |
|---|---|---|---|---|---|---|
| H | Cl | S—$C_6H_5$ | Cl | H | 136-9 | 0.0008 |
| H | Cl | CO—$CH_3$ | H | H | 102-10 | |
| H | Cl | CO—(2-$CH_3$-4-$BrC_6H_3$) | H | H | (amorphous) | |
| H | Cl | O—(2-$C_2H_5$-4-$ClC_6H_3$) | H | H | 169-71 | |
| H | Cl | morpholino | Cl | H | 231-3 | 0.0030 |
| H | $CH_3$ | O—(4-$BrC_6H_4$) | H | H | 179-81 | 0.0008 |
| H | Cl | O—(2-n-$C_3H_7$-4-$ClC_6H_3$) | H | H | 130-2 | 0.012 |
| H | Cl | O—(2-$C_2H_5$-4-$BrC_6H_3$) | H | H | 164-5 | |
| H | $NO_2$ | O—(2-$C_2H_5$-4-$ClC_6H_3$) | H | H | 187-8 | |
| H | $CH_3$ | O—(2-$C_2H_5$-4-$ClC_6H_3$) | H | H | 118-9 | 0.012 |
| H | Cl | $SO_2N(CH_3)(CH_2CH=CH_2)$ | H | H | 148-9 | 0.0060 |
| H | Cl | $SO_2N(CH_3)(n-C_3H_7)$ | H | H | 167-70 | ~0.0250 |
| H | Cl | $SO_2N(CH_3)(i-C_3H_7)$ | H | H | 188-90 | ~0.0250 |
| H | Cl | $SO_2N(CH_2CH=CH_2)_2$ | H | H | 120-1 | |
| H | Cl | $SO_2N(CH_3)(4-ClC_6H_4)$ | H | H | 164-5 | |
| H | H | $SO_2$(morpholino) | H | H | 264 | 0.0250 |
| H | $CH_3$ | $SO_2$(morpholino) | H | H | 243-44 | 0.00150 –0.0030 |
| H | $CH_3$ | $SO_2N(CH_2CH=CH_2)_2$ | H | H | 118 | >0.0250 |

*Tested as described in Example VI.

EXAMPLE II

The 2-phenyl-as-triazine-3,5(2H,4H) diones listed below are prepared from the appropriate aniline compounds by the procedure of Example I.

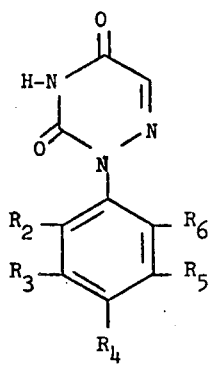

| $R_2$ | $R_3$ | $R_4$ | $R_5$ | $R_6$ |
|---|---|---|---|---|
| Cl | H | H | H | H |
| F | H | H | H | H |
| $CH_3$ | H | H | H | H |
| H | $CH_3$ | H | H | H |
| H | H | $CH_3$ | H | H |
| H | $NO_2$ | H | H | H |
| H | O—(n-$C_3H_7$) | H | H | H |
| H | H | $OCH_3$ | H | H |
| Cl | H | Cl | H | H |
| H | Br | H | H | H |
| H | Br | H | Br | H |
| H | I | I | H | H |
| F | H | F | H | H |
| F | H | H | H | F |
| F | H | H | H | $CH_3$ |
| H | F | H | F | H |
| Cl | H | H | F | H |
| H | Cl | F | H | H |
| H | F | Cl | H | H |
| Cl | H | H | Br | H |
| H | Cl | Br | H | H |
| H | Br | I | H | H |
| $CH_3$ | H | H | Cl | H |
| H | $CH_3$ | $NO_2$ | H | H |
| H | $NO_2$ | $CH_3$ | H | H |
| $CH_3$ | H | H | $NO_2$ | H |
| H | Cl | $OCH_3$ | H | H |
| CN | H | $NO_2$ | H | H |
| N | $OCH_3$ | $NO_2$ | H | H |
| H | $OCH_3$ | $CH_3$ | H | H |
| H | $CH_3$ | $OCH_3$ | H | H |
| F | H | $OC_2H_5$ | H | H |
| $CH_3$ | $CF_3$ | H | H | H |
| $CH_3$ | H | H | $CF_3$ | H |
| H | I | $OCH_3$ | H | H |
| $CH_3$ | H | H | I | H |
| H | $OCH_3$ | H | I | H |
| H | I | $OC_2H_5$ | H | H |
| H | $OCH_3$ | Cl | H | H |
| H | H | $OC_2H_5$ | H | H |
| H | $OC_2H_5$ | H | Cl | H |
| H | $NO_2$ | Cl | H | H |
| H | Br | I | H | H |
| Cl | H | $NO_2$ | H | H |
| H | $NO_2$ | H | $CF_3$ | H |
| H | $CF_3$ | $NO_2$ | H | H |
| $CF_3$ | H | H | CN | H |
| H | $CH_3$ | CN | H | H |
| CN | H | $CH_3$ | H | H |
| $CH_3$ | CN | H | H | H |
| CN | H | $CF_3$ | H | H |
| H | F | $OCH_3$ | H | H |
| CN | H | H | Cl | H |
| Cl | H | $CF_3$ | H | H |
| H | $CF_3$ | Cl | H | H |
| Cl | H | H | $CF_3$ | H |
| F | H | H | $CF_3$ | H |
| $CF_3$ | H | H | $CF_3$ | H |
| H | F | $CH_3$ | H | H |
| H | $CH_3$ | Br | H | H |
| $CH_3$ | H | F | H | H |
| $CH_3$ | I | H | H | H |
| F | F | F | F | F |
| $C_2H_5$ | H | Br | $NO_2$ | H |
| H | Br | n-$C_3H_7$ | H | H |
| Cl | H | O—(n-$C_4H_9$) | H | H |
| H | Cl | O—(n-$C_4H_9$) | H | H |
| H | H | S—(n-$C_4H_9$) | Cl | H |
| Cl | $OCH_3$ | H | $OCH_3$ | H |
| Cl | H | H | $NO_2$ | H |
| H | Cl | S—$CH_3$ | H | H |
| H | F | I | F | H |
| H | H | H | $C_2H_5$ | H |
| i-$C_3H_7$ | H | $C_2H_5$ | $NO_2$ | H |
| H | I | SCN | H | H |
| Cl | $NO_2$ | H | H | H |
| H | $NO_2$ | F | H | H |
| H | H | O—(2-$NO_2C_6H_4$) | H | H |
| H | H | O—(3-$NO_2C_6H_4$) | H | H |
| H | H | O—(4-$NO_2C_6H_4$) | H | H |
| H | H | O—$C_6H_5$ | H | H |
| H | $CH_3$ | $SO_2$—(4-$NO_2C_6H_4$) | H | H |
| H | $NO_2$ | O—$C_6H_5$ | H | H |
| H | H | $SCH_3$ | $SCH_3$ | H |
| H | H | SCN | H | H |
| H | H | $CF_3$ | H | H |
| H | H | $COCH_3$ | H | H |
| H | H | O—(4-$ClC_6H_4$) | H | H |
| H | $CH_3$ | O—(2-$CH_3C_6H_4$) | H | H |
| H | $CH_3$ | O—(3-$BrC_6H_4$) | H | H |

-Continued

| $R_2$ | $R_3$ | $R_4$ | $R_5$ | $R_6$ |
|---|---|---|---|---|
| H | CH$_3$ | O—(4-CNC$_6$H$_4$) | H | H |
| H | H | O—(2-CNC$_6$H$_4$) | H | H |
| H | CF$_3$ | O—(4-(CN)C$_6$H$_4$) | H | H |
| H | CF$_3$ | O—(2-C$_2$H$_5$C$_6$H$_4$) | H | H |
| H | CH$_3$ | O—(2-NO$_2$C$_6$H$_4$) | H | H |
| H | Br | O—(i-C$_3$H$_7$) | H | H |
| H | Cl | O—(t-C$_4$H$_9$) | H | H |
| H | CF$_3$ | OCH$_3$ | CH$_3$ | H |
| H | CH$_3$ | OC$_2$H$_5$ | C$_2$H$_5$ | H |
| H | OCH$_3$ | H | H | H |
| H | OCH$_3$ | Cl | H | H |
| Cl | Cl | OCH$_3$ | Cl | H |
| H | CH$_3$ | OCH$_3$ | CH$_3$ | H |
| H | H | S—(3-ClC$_6$H$_4$) | H | H |
| H | H | S—(2-ClC$_6$H$_4$) | H | H |
| C$_2$H$_5$ | H | S-C$_6$H$_5$ | H | H |
| H | CH$_3$ | S—(4-C$_4$H$_9$OC$_6$H$_4$) | CH$_3$ | H |
| H | CH$_3$ | S—(4-NO$_2$C$_6$H$_4$) | CH$_3$ | H |
| H | NO$_2$ | S-C$_6$H$_5$ | H | H |
| C$_2$H$_5$ | H | S—(4-FC$_6$H$_4$) | NO$_2$ | H |
| H | CH$_3$ | S—(2-CH$_3$OC$_6$H$_4$) | CH$_3$ | H |
| H | H | S—(3-CH$_3$C$_6$H$_4$) | H | H |
| H | CH$_3$ | S—(3-BrC$_6$H$_4$) | H | H |
| H | CH$_3$ | S—(4-IC$_6$H$_4$) | H | H |
| F | OCH$_3$ | H | OCH$_3$ | H |
| F | OCH$_3$ | CO—C$_6$H$_5$ | OCH$_3$ | H |
| H | CF$_3$ | CO—(4-CH$_3$OC$_6$H$_4$) | CF$_3$ | H |
| H | SCN | CO—C$_6$H$_5$ | SCN | H |
| H | OCH$_3$ | CO—C$_6$H$_5$ | OCH$_3$ | H |
| F | OCH$_3$ | CO—C$_6$H$_5$ | OCH$_3$ | F |
| H | CN | CO—C$_6$H$_5$ | CN | H |
| H | OCH$_3$ | CO—(o-tolyl) | OCH$_3$ | H |
| H | OCH$_3$ | CO—(2-NO$_2$C$_6$H$_4$) | OCH$_3$ | H |
| H | OCH$_3$ | CO—(3-CNC$_6$H$_4$) | OCH$_3$ | H |
| H | SCH$_3$ | CO—C$_6$H$_5$ | SCH$_3$ | H |
| H | SCH$_3$ | CO—(2-BrC$_6$H$_4$) | SCH$_3$ | H |
| F | OCH$_3$ | CO—(4-FC$_6$H$_4$) | OCH$_3$ | F |
| F | OCH$_3$ | CO—(4-CNC$_6$H$_4$) | OCH$_3$ | F |
| F | SCH$_3$ | CO—(4-CH$_3$C$_6$H$_4$) | SCH$_3$ | F |
| H | H | CO—(4-BrC$_6$H$_4$) | H | H |
| H | H | CO—(4-I-C$_6$H$_4$) | H | H |
| F | F | CO—C$_6$H$_5$ | F | F |
| H | H | CO—(4-CNC$_6$H$_4$) | H | H |
| F | SCH$_3$ | CO—(2-ClC$_6$H$_4$) | SCH$_3$ | H |
| H | SCN | CO—C$_6$H$_5$ | SCN | H |
| H | CN | CO—C$_6$H$_5$ | CN | H |
| H | CF$_3$ | CO—C$_6$H$_5$ | CF$_3$ | H |
| H | CF$_3$ | CO—(o-tolyl) | CF$_3$ | H |
| H | CF$_3$ | CO—(3-CNC$_6$H$_4$) | CF$_3$ | H |
| H | CF$_3$ | CO—(4-FC$_6$H$_4$) | CF$_3$ | H |
| H | SCN | CO—(p-tolyl) | SCN | H |
| H | SCN | CO—(3-CNC$_6$H$_4$) | SCN | H |
| H | SCN | CO—(4-CH$_3$OC$_6$H$_4$) | SCN | H |
| H | SCN | CO—[(4-i-C$_3$H$_7$)C$_6$H$_4$] | SCN | H |
| H | CN | CO—[(4-t-C$_4$H$_9$)C$_6$H$_4$] | CN | H |
| H | CN | CO—(o-tolyl) | CN | N |
| H | CN | CO—(2-ClC$_6$H$_4$) | CN | H |
| H | CN | CO—(4-FC$_6$H$_4$) | CN | H |
| H | CN | CO—(4-C$_2$H$_5$OC$_6$H$_4$) | CN | H |
| H | Cl | OC$_6$H$_5$ | Cl | H |
| H | CH$_3$ | OC$_6$H$_5$ | CH$_3$ | H |
| H | H | SC$_6$H$_5$ | H | H |
| H | Cl | SC$_6$H$_5$ | H | H |
| H | CH$_3$ | SC$_6$H$_5$ | H | H |
| H | CH$_3$ | SC$_6$H$_5$ | CH$_3$ | H |
| H | H | CO—C$_6$H$_5$ | H | H |
| H | Cl | CO—C$_6$H$_5$ | Cl | H |
| H | CH$_3$ | CO—C$_6$H$_5$ | CH$_3$ | H |
| CH$_3$ | H | COCH$_3$ | CH$_3$ | H |
| H | CH$_3$ | COCH$_3$ | CH$_3$ | H |
| H | OCH$_3$ | COCH$_3$ | H | H |
| H | C$_3$H$_7$ | COCH$_3$ | H | H |
| H | Cl | COC$_2$H$_5$ | H | H |
| H | CH$_3$ | S—(4-CH$_3$C$_6$H$_4$) | H | H |
| H | CH$_3$ | S—(4-CH$_3$C$_6$H$_4$) | CH$_3$ | H |
| H | H | S—(4-CH$_3$C$_6$H$_4$) | H | H |
| F | H | S—(4-CH$_3$C$_6$H$_4$) | H | H |
| H | H | O—[2,4-(CH$_3$O)$_2$C$_6$H$_3$] | H | H |
| H | CH$_3$ | O—[2,4-(CH$_3$O)$_2$C$_6$H$_3$] | CH$_3$ | H |
| H | Cl | O—(2-CH$_3$O-4-CNC$_6$H$_3$) | Cl | H |
| H | Cl | O—[2,4-(t-C$_4$H$_9$)$_2$C$_6$H$_3$] | H | H |
| H | CH$_3$ | O—[2,4-(C$_2$H$_5$)$_2$C$_6$H$_3$] | Cl | H |
| H | CF$_3$ | O—(3-Br-4-CNC$_6$H$_3$) | H | H |
| H | NO$_2$ | O—(2,4-Cl$_2$C$_6$H$_3$) | H | H |
| H | H | O—[2-Cl-4-(n-C$_4$H$_9$O)C$_6$H$_3$] | H | H |
| Cl | H | O—(2-Cl-4-CNC$_6$H$_3$) | H | H |
| H | OCH$_3$ | O—[2-NO$_2$-4-(CH$_3$O)C$_6$H$_3$] | H | H |
| H | CH$_3$ | S—(2,4-Br$_2$C$_6$H$_3$) | CH$_3$ | H |
| H | CH$_3$ | S—[3,4-(CH$_2$O$_2$)C$_6$H$_3$] | H | H |
| H | CN | S—(4-IC$_6$H$_4$) | H | H |
| H | Cl | S—[2,4-(NO$_2$)$_2$C$_6$H$_3$] | CH$_3$ | H |
| H | Cl | S—(3,5-Cl$_2$C$_6$H$_3$) | CH$_3$ | H |
| H | Cl | S—[2,6-(C$_2$H$_5$)$_2$C$_6$H$_3$] | H | H |
| H | H | S—[3,4-(C$_2$H$_5$O)$_2$C$_6$H$_3$] | H | H |
| F | OCH$_3$ | CO—[3,4-(CH$_3$)$_2$C$_6$H$_3$] | OCH$_3$ | F |
| F | OCH$_3$ | CO—(2,4-Br$_2$C$_6$H$_3$) | OCH$_3$ | H |
| H | H | CO—(4-CH$_3$-2-ClC$_6$H$_3$) | H | H |
| H | H | CO—(2-OCH$_3$-4-ClC$_6$H$_3$) | H | H |
| H | CH$_3$ | CO—[2,4-(CH$_3$O)$_2$C$_6$H$_3$] | CH$_3$ | F |
| F | CH$_3$ | CO—(2-n-C$_3$H$_7$-4-IC$_6$H$_3$) | CH$_3$ | F |
| H | CF$_3$ | CO—(4-CH$_3$-2-ClC$_6$H$_3$) | CF$_3$ | H |
| H | H | S—n-C$_4$H$_9$ | H | H |
| H | Cl | S—n-C$_4$H$_9$ | H | H |
| H | H | SO$_2$—n-C$_4$H$_9$ | H | H |
| H | Cl | SO$_2$—n-C$_4$H$_9$ | H | H |
| H | Cl | SO$_2$—n-C$_4$H$_9$ | Cl | H |
| H | Cl | S—C$_6$H$_5$ | Cl | H |
| H | Cl | SO$_2$—C$_6$H$_5$ | Cl | H |
| H | Cl | S—C$_9$H$_{19}$ | CH$_3$ | H |
| H | Cl | SO$_2$—C$_9$H$_{19}$ | CH$_3$ | H |
| CH$_3$ | H | SO$_2$—C$_2$H$_5$ | CH$_3$ | H |
| F | H | S—i-C$_3$H$_7$ | H | H |
| F | H | SO$_2$-i-C$_3$H$_7$ | H | H |
| H | OCH$_3$ | S—C$_6$H$_{13}$ | OCH$_3$ | H |
| H | OCH$_3$ | SO$_2$—C$_6$H$_{13}$ | OCH$_3$ | H |
| H | CF$_3$ | S—C$_8$H$_{17}$ | H | H |
| H | CF$_3$ | SO$_2$—C$_8$H$_{17}$ | H | H |
| H | Cl | N(CH$_3$)$_2$ | Cl | H |
| H | Cl | N(C$_2$H$_5$)$_2$ | Cl | H |
| H | Cl | N(C$_3$H$_7$)$_2$ | Cl | H |
| H | Cl | N(i-C$_3$H$_7$)$_2$ | Cl | H |
| H | Cl | N(C$_4$H$_9$)$_2$ | Cl | H |
| H | Cl | N(t-C$_4$H$_9$)$_2$ | Cl | H |
| H | Cl | N(CH$_3$)(C$_4$H$_9$) | Cl | H |
| H | Cl | N(CH$_3$)(C$_2$H$_5$) | Cl | H |
| H | Cl | thiomorpholino | Cl | H |
| H | Cl | piperazino | Cl | H |
| H | Cl | pyrrolo | Cl | H |
| H | Cl | pyrrolino | Cl | H |
| H | Cl | pyrrolidino | Cl | H |
| H | Cl | piperidino | Cl | H |
| H | Cl | N-methylpiperazino | Cl | H |
| H | Cl | N-(n-butyl)piperazino | Cl | H |
| H | Cl | thiazolidino | Cl | H |
| H | Cl | Δ$^3$-tetrahydropyridino | Cl | H |
| H | Cl | hexamethyleneimino | Cl | H |
| H | C$_2$H$_5$ | O—(2,4-Cl$_2$C$_6$H$_3$) | C$_2$H$_5$ | H |
| H | C$_2$H$_5$ | O—(2-Cl-4-BrC$_6$H$_3$) | C$_2$H$_5$ | H |
| H | CH$_3$ | O—(2,4-Cl$_2$C$_6$H$_3$) | CH$_3$ | H |
| H | CH$_3$ | O—(2-Cl-4-BrC$_6$H$_3$) | CH$_3$ | H |
| H | C$_2$H$_5$ | O—(4-ClC$_6$H$_4$) | C$_2$H$_5$ | H |
| H | C$_2$H$_5$ | O—(4-BrC$_6$H$_4$) | C$_2$H$_5$ | H |
| H | NO$_2$ | O—(2,4-Cl$_2$C$_6$H$_3$) | H | H |
| H | NO$_2$ | O—(2-Cl-4-BrC$_6$H$_3$) | H | H |
| H | CH$_3$ | S—(4-BrC$_6$H$_4$) | CH$_3$ | H |
| H | CH$_3$ | S—(2-CH$_3$-4-ClC$_6$H$_3$) | CH$_3$ | H |
| H | CH$_3$ | S—(2-C$_2$H$_5$-4-ClC$_6$H$_3$) | CH$_3$ | H |
| H | CH$_3$ | S—(2-i-C$_3$H$_7$-4-ClC$_6$H$_3$) | CH$_3$ | H |
| H | Cl | S—(2-CH$_3$-4-ClC$_6$H$_3$) | Cl | H |
| H | C$_2$H$_5$ | SO$_2$—morpholino | C$_2$H$_5$ | H |
| H | I | SO$_2$—morpholino | I | H |
| H | i-C$_3$H$_7$ | SO$_2$—morpholino | i-C$_3$H$_7$ | H |
| H | Cl | SO$_2$—morpholino | Cl | H |
| H | Br | SO$_2$—morpholino | Br | H |
| H | Cl | O—[2,6-(CH$_3$)$_2$-4-ClC$_6$H$_2$] | H | H |
| H | H | CHOH—(4-ClC$_6$H$_4$) | H | H |
| H | CH$_3$ | CHOH—(2-CH$_3$-4-BrC$_6$H$_3$) | H | H |
| H | H | CHOH—(4-BrC$_6$H$_4$) | H | H |
| H | H | CHOH—(4-CH$_3$-2-ClC$_6$H$_3$) | H | H |
| H | Cl | S—(3,5-Cl$_2$C$_6$H$_3$) | H | H |
| H | Cl | S—(3-CH$_3$-S-ClC$_6$H$_3$) | H | H |
| H | Cl | S—(3,5-(CH$_3$)$_2$-4-ClC$_6$H$_2$) | H | H |
| H | CH$_3$ | S—(3-CH$_3$-5-ClC$_6$H$_3$) | H | H |
| H | Cl | S—(3-CNC$_6$H$_4$) | Cl | H |

The above compounds and those of Example I wherein $R_4$ is a thiophenyl or thio(substituted phenyl)moiety are readily converted to the corresponding sulfinyl and sulfonyl analogs.

EXAMPLE III

2-[3,5-Dimethyl-4-(Morpholinosulfonyl)Phenyl]-as-Triazine-3,5(2H,4H) Dione 2-(3,5-dimethylphenyl)-as-triazine-3,5(2H,4H) dione (49.0 g.) is added in small portions to chlorosulfonic acid (100 ml.) at room temperature. The mixture is stirred throughout the exothermic reaction. When addition is complete, the mixture is heated to 60°–65°C. for 2 hours then cooled to 20°C. It is transferred to a separatory funnel and added dropwise to a stirred volume (3 liters) of ice water. After one-half hour the product, 2-[3,5-dimethyl-4-(chlorosulfonyl)phenyl]-as-triazine-3,5(2H,4H) dione, is recovered by filtration, washed with water, and dried in vacuo. The dry solid is triturated with ether (200 ml.), filtered, washed with ether, and dried. Yield = 60.5 g. Further purification is achieved by slurrying the product in hot chloroform, filtering, and drying; m.p. = 198°–201°C.

To a stirred solution of 2-[3,4-dimethyl-4-(chlorosulfonyl)phenyl]-as-triazine-3,5(2H,4H) dione (1.5 g.) in dry tetrahydrofuran (15 ml.) at room temperature is added distilled morpholine (1 ml.). The mixture is heated at 60°C. for 16 hours, precautions being taken to exclude moisture. The reaction mixture is cooled, poured into dilute hydrochloride acid (600 ml. of 6N), and stirred for 4 hours. The precipitate is filtered off, washed with water, and dried. It is recrystallized from ethanol; m.p. = 199°–200°C.; MEC = 0.0015.

In like manner, the following compounds are prepared from appropriate reactants:

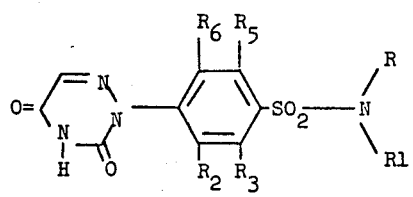

| $R_2$ | $R_3$ | $NRR_1$ | $R_5$ | $R_6$ |
|---|---|---|---|---|
| H | Br | morpholino | H | H |
| H | H | $N(CH_3)_2$ | H | H |
| H | $CF_3$ | $N(CH_3)_2$ | H | H |
| H | Cl | thiomorpholino | H | H |
| CN | H | $N(C_2H_5)_2$ | H | H |
| H | F | piperazino | H | H |
| H | Cl | pyrrolo | $CH_3$ | H |
| H | CN | piperidino | $CH_3$ | H |
| H | Cl | $N(CH_3)_2$ | $CH_3$ | H |
| H | Br | N-methylpiperazino | $CH_3$ | H |
| H | $CH_3$ | hexamethyleneimino | $CH_3$ | H |
| H | $CH_3$ | pyrrolino | $CH_3$ | H |
| Cl | Cl | thiazolidino | H | H |
| H | $CF_3$ | $N(CH_3)_2$ | $CF_3$ | H |
| H | $OCH_3$ | $N(C_2H_5)_2$ | $OCH_3$ | H |
| H | $OCH_3$ | morpholino | $OCH_3$ | H |
| H | $SCH_3$ | pyrrolidino | H | H |
| H | Cl | morpholino | Cl | H |
| H | Cl | 3,4-dichloropiperidino | Cl | H |
| $CH_3$ | H | $N(CH_3)_2$ | Cl | H |
| H | SCN | $N(CH_3)_2$ | H | H |
| H | O—(n-$C_3H_7$) | $\Delta^3$-tetrahydropyrimidino | H | H |
| H | F | $N(CH_3)_2$ | F | H |
| Cl | $OCH_3$ | morpholino | $OCH_3$ | H |
| H | H | $N(CH_2—CH=CH_2)_2$ | H | H |
| H | H | $N(CH_3)(C_2H_5)$ | H | H |
| H | H | $N(CH_3)(CH_2—CH=CH_2)$ | H | H |
| H | H | $N(CH_2—C\equiv CH)_2$ | H | H |
| H | Cl | $N(CH_2—CH=CH2)_2$ | H | H |
| H | $SCH_3$ | $N(CH_2—CH=CH_2)(C_7H_7)$ | H | H |
| H | $CF_3$ | $N(CH_2—CH=CH_2)(C_6H_5)$ | H | H |
| H | Cl | $N(CH_3)(4-ClC_6H_4)$ | $CH_3$ | H |
| H | CN | $N(CH_3)(C_7H_7)$ | $CH_3$ | H |
| H | $CH_3$ | $N(C_6H_5)(CH_3)$ | $CH_3$ | H |
| H | $CH_3$ | $N(CH_2—C\equiv CH)(C_7H_7)$ | $CH_3$ | H |
| H | $OCH_3$ | $N(CH_3)(CH_2—CH=CH_2)$ | H | H |
| H | $NO_2$ | $N(CH_2—CH=CH_2)_2$ | $CH_3$ | H |
| H | Cl | $N(CH_3)(C_6H_5)$ | Cl | H |
| Cl | Cl | $N(C_2H_5)(C_7H_7)$ | H | H |

-Continued

| $R_2$ | $R_3$ | $NRR_1$ | $R_5$ | $R_6$ |
|---|---|---|---|---|
| CN | H | $N(C_2H_5)(4-ClC_6H_4)$ | H | H |
| F | $OCH_3$ | $N(CH_3)_2$ | $OCH_3$ | H |
| F | H | $N(C_6H_5)(CH_2—CH=CH_2)$ | $CF_3$ | H |
| H | $CH_3$ | piperidino | $CH_3$ | H |
| H | Cl | piperidino | Cl | H |
| H | $CH_3$ | thiomorpholino | Cl | H |
| H | $CH_3$ | pyrrolidino | $CH_3$ | H |
| H | Cl | piperazino | Cl | H |
| H | $CH_3$ | pyrrolo | $CH_3$ | H |

EXAMPLE IV 2-(4-nitrophenyl)-as-Triazine-3,4(2H,4H) Dione

To a solution of 6-azauracil (56.5 gms., 0.5 mole) and potassium hydroxide (101 gms. of 85% KOH) in water (750 ml.) is added dropwise, over a four-hour period, 4-nitrofluorobenene (83.3 g., 0.59 mole) at a temperature of 55°–60°C. The mixture is maintained at this temperature for an additional 4 hours, then cooled and extracted with 3 × 250 ml. volumes of methylene chloride. It is then acidified to pH 3.5 with hydrochloric acid and the resulting precipitate collected, washed with water, and air dried.

EXAMPLE V

The alkali metal and alkaline earth metal salts of the 2-phenyl-as-triazine-3,5(2H,4H) diones of Examples I through IV are prepared by dissolving the appropriate compound in an aqueous or aqueous alcohol solution containing an equivalent amount of the alkali metal (sodium, lithium, potassium) or alkaline earth metal (calcium, barium, strontium, magnesium) hydroxide. The salts are recovered by freeze-drying the resulting solution.

EXAMPLE VI

The coccidiostatic activity of 2-(3,4-dichlorophenyl)-as-triazine-3,5(2H,4H) dione is demonstrated as follows:

Groups of five nine-day old Barred Rock Cross strain cockerels are fed a basal ration into which the test compound is incorporated at various concentrations. The basal ration, a commercial chick starter (Purina Commercial Chick Starter, available from the Ralston Purina Co., St. Louis, Mo.), having the following composition, is presented ad libitum to the chicks twenty-four hours before infection and continuously thereafter throughout the course of the tests.

| Basal Ration Composition | |
|---|---|
| Crude protein not less than | 18.0% |
| Crude fat not less than | 3.0% |
| Crude fiber not more than | 6.0% |
| Added minerals not more than | 3.5% | supplied by the following ingredients:

Meat and bone meal, fish meal, soybean meal, ground barley, ground oats, ground yellow corn, dehydrated alfalfa meal, wheat middlings, vitamin $B_{12}$ supplement, ethoxyquin (a preservative), animal fat preserved with BHA*, choline chloride, niacin, vitamin A supplement, riboflavin supplement, calcium pantothenate, D activated animal sterol, vitamin E supplement, menadione sodium bisulfite (source of vitamin K activity)**, calcium carbonate, low fluorine rock phosphate, iodized salt, manganese sulfate, manganous oxide, copper sulfate, zinc oxide.

*BHA = butylated hydroxyanisole
**menadione sodium bisulfite = 2-methyl-1,4-napthaquinone sodium bisulfite Twenty-four hours after initiation of the medication, the chicks are inoculated orally with 200,000 sporulated cocysts (*Eimeria tenella*) and the average weight per bird per group determined. In addition, a group of 10 chicks is fed the basal ration which contains more of the test compound (infected, untreated controls). A further group of ten chicks serves as uninfected, untreated controls. The chicks are examined on the fifth and sixth day post-infection for signs of hemorrhage. On the eighth day post-infection, the average body weight per bird per group is determined, the birds necropsied, the cecum examined macroscopically, and a pathology index (average degree of infection [A.D.I.]) determined. Chicks which die prior to the fifth day post-infection are considered as toxic deaths. Those which die five days post-infection or later are considered as deaths due to disease. The efficacy of the test compound is judged by the prevention of mortality and by comparison of the pathologic index with that of the unmedicated infected controls. The degree of pathologic involvement at necropsy is expressed as the average degree based on the following scheme: 0 = no cecal lesions; 1 = slight lesion; 2 = moderate lesions; 3 = severe lesions; 4 = death.

The concentration of test compound in the feed which will produce normal weight gains relative to the uninfected, untreated controls and normal pathology relative to the infected, untreated controls, referred to as the minimum effective concentration (MEC), is thus found to be 0.006 percent.

In like manner, the coccidiostatic activity of the compouns of Examples I through V is determined.

EXAMPLE VII

Various levels of 2-(3,4-dichlorophenyl)-as-triazine-3,5(2H,4H) dione are thoroughly blended into a nutritionally-balanced diet having the composition shown below to provide feeds containing 0.0015 percent, 0.001 percent, 0.0025 percent, 0.005 percent, 0.01 percent, 0.025 percent, 0.05 percent and 0.1 percent, respectively, of the active agent.

| | Percent |
|---|---|
| Ground yellow corn | 51.28 |
| Soybean oil meal | 38.15 |
| Corn oil | 6.10 |
| CaCO$_3$ | 1.20 |
| Dicalcium phosphate | 1.35 |
| Salt | 0.61 |
| Delamix (commercially available mineral mix containing CaCO$_3$ and small amounts of iron, zinc manganese and so forth, salts - Limestone Products Corporation of America, New Jersey) | 0.1 |
| Vitamin A (5305 I.U./lb.) | 0.1 |
| Vitamin D$_3$ (681 I.C.U./lb.) | 0.05 |
| Klotogen F (commercially available form of vitamin K, Abbott Laboratories) | 0.0003 |
| Pyridoxine hydrochloride | 0.0006 |
| D.l.-methionine | 0.140 |
| Niacin U.S.P. | 0.0025 |
| Choline chloride (25%) | 0.2 |
| Riboflavin | 0.06 |
| Calcium pentothenate (45%) | 0.002 |

-Continued

| | Percent |
|---|---|
| Myvanix (commercially available form of vitamin E) | 0.005 |

Such feeds, when administered ad libitum to nine-day old chicks and to medium-sized turkey poults infected with *E. tenella*, as described in Example X, are effective in controlling the coccidial infection.

The products of Examples I through V when tested at levels of 0.0015 percent, 0.001 percent, 0.01 percent and 0.05 percent, produce results comparable to those of the above compositions.

PREPARATION A

Alkoxy Substituted Anilines 3,5-Dichloro-4-isopropoxyaniline

To a dry flask charged with a dry nitrogen atmosphere under positive pressure is added a mineral oil dispersion of sodium hydride (5.1 g. of 55%). The mineral oil is removed by three successive washes (3 × 50 ml.), the benzene being drawn off through a sintered glass dispersion tube connected to a vacuum line. Dimethoxyethane (50 ml.) is added and, with stirring, 2,6-dichloro-4-nitrophenol (25.8 g.) added portionwise over a 20 minute period. Isopropyl iodide (2.04 g.) is then added and the mixture refluxed under nitrogen for 36 hours. It is allowed to cool to room temperature and filtered. The filtrate is concentrated to a dark oil under reduced pressure and the residue shaken with a mixture of ether (200 ml.), 10 percent aqueous sodium hydroxide (100 ml.) and water (2 liters). The aqueous layer is drawn off and extracted with ether (2 × 100 ml.). The combined ether extracts are washed successively with water (5 × 100 ml.) and saturated brine (3 × 100 ml.) and dried (Na$_2$SO$_4$). Removal of the ether affords the product (14.6 g.).

A Parr bomb is charged with 3,5-di chloro-4-isopropoxy nitrobenzene (14.3 g.), absolute ethanol (210 ml.) and palladium-on-carbon (1.5 g. of 5%). The mixture is shaken under 52 psi of hydrogen for 2 hours. The reaction mixture is removed from the bomb, filtered through a diatomaceous earth pad the the pad washed with benzene. The filtrate is mixed with additional benzene (300 ml.) and evaporated under reduced pressure to a light yellow oil (12.8 g.) which crystallized upon standing. The product is ground to a fine powder.

In like manner, the following alkoxy substituted anilines are prepared from appropriate nitrophenols:

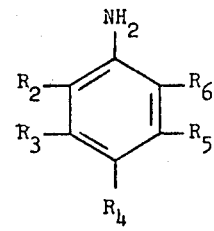

| $R_2$ | $R_3$ | $R_4$ | $R_5$ | $R_6$ |
|---|---|---|---|---|
| H | CH₃ | OCH₃ | CH₃ | H |
| H | CH₃ | OCH₃ | C₂H₅ | H |
| Cl | H | O—n-C₄H₉ | H | H |
| H | CF₃ | OCH₃ | CH₃ | H |
| H | Cl | O—t-C₄H₉ | H | H |
| H | Br | O—i-C₃H₇ | H | H |
| H | Cl | OCH₃ | H | H |
| H | H | OC₂H₅ | H | H |
| H | OCH₃ | H | H | H |
| H | F | OCH₃ | H | H |
| F | H | OC₂H₅ | H | H |
| H | OCH₃ | Cl | H | H |
| Cl | Cl | OCH₃ | Cl | H |

PREPARATION B

Aminobenzophenones

Method I. 4-Chloro-4'-aminobenzophenone

Aluminum chloride (45 g.) and carbon disulfide (100 ml.) are charged to a dry flask under an atmosphere of nitrogen and cooled in an ice bath. A solution of 4-nitrobenzoyl chloride (22.2 g.) in carbon disulfide (50 ml.) and chlorobenzene (50 ml.) is added dropwise over a half-hour period. The ice bath is removed and the reaction mixture stirred at room temperature for 2 hours then refluxed overnight. The mixture is cooled and slowly poured into one liter of ice water with rapid stirring. The aqueous mixture is extracted with methylene chloride (3 × 200 ml.), the extracts combines, washed successively with water (1 × 100 ml.), saturated aqueous sodium bicarbonate (2 × 100 ml.) and saturated brine (3 × 100 ml.) and dried over anhydrous sodium sulfate. The methylene chloride is evapoarted under reduced pressure, the gummy residue dissolved in dimethoxyethane:6N hydrochloric acid and heated on a steam bath of a half-hour. The dimethoxyethane is removed under reduced pressure and the residue dissolved in methylene chloride (500 ml.). The methylene chloride solution is washed with water (1 × 100 ml.), saturated aqueous sodium bicarbonate (3 × 200 ml.), water (2 × 200 ml.) and saturated brine (3 × 200 ml.). It is dried (Na₂SO₄) and evaporated under reduced pressure to a brown solid, which is triturated with ether, filtered and dried; 8.23 g.; m.p. = 78°-85°C.

To a slurry of 4-chloro-4'-nitrobenzophenone (7.0 g.) in 95 percent ethanol (175 ml.) is added a solution of stannous chloride dihydrate (29.9 g.) in concentrated hydrochloric acid (63 ml.) over a half-hour period. The temperature rose to 36°C. and a clear yellow solution formed. It is stirred for 18 hours at ambient temperature and then adjusted to pH 11.0 by the dropwise addition of 10 percent aqueous hydroxide with cooling. The yellow solid which forms is separated and dissolved in methylene chloride (200 ml.). The solution is washed with water (2 × 200 ml.), saturated brine (3 × 200 ml.) and dried (Na₂SO₄). Removal of the solvent gives the product as a yellow solid; 3.16 g.; m.p. = 175°-178°C.

Method II. 2-Methyl-4-aminobenzophenone

To a flame-dried flask fitted with a condenser, nitrogen inlet, mechanical stirrer and dropping funnel, and charged with a dry nitrogen atmosphere is added m-acetotoluidide (49.9 g.) and anhydrous aluminum chloride (178.6 g.). The resulting yellow slurry is cooled in an ice bath and benzoyl chloride (94.2 g.) added dropwise. An orange gum resulted. The ice bath is removed and the mixture stirred at room temperature for one-half hour and then heated on a steam bath for 2 hours. The slurry is then cooled and poured onto crushed ice and concentrated hydrochloric acid. A vigorous evolution of hydrogen chloride took place and a gummy solid precipitated. The solid is dissolved in ethyl acetate (350 ml.), washed once with saturated brine (200 ml.) and reduced in volume to an oil. The oil is heated with 6N HCl (600 ml.) on a steam bath for one hour. The reaction mixture is layered with methylene chloride (500 ml.) and neutralized with solid sodium bicarbonate. The aqueous phase is extracted again with methylene chloride (200 ml.) and the combined extracts washed with aqueous sodium bicarbonate (200 ml. of 2%), water (3 × 200 ml.) and saturated brine (3 × 200 ml.) and dried over anhydrous Na₂SO₄. The solvent is removed at reduced pressure affording 61.2 g. of yellow solid. The solid is dissolved in methylene chloride (600 ml.) and boiled on a steam bath. The volume was held at 600 ml. by the dropwise addition of hexane. After about 400 ml. of hexane is added, crystals begin to deposit from the hot solution. These are allowed to collect as the solution cools slowly to room temperature. They are collected by suction filtration and dried in vacuum over phosphorous pentoxide to give 29.5 g. of yellow solid; m.p. = 137°-140°C.

The aminobenzophenones listed below are prepared by these methods from appropriate benzoyl chlorides and chlorobenzenes (method I) or acetanilides (method II):

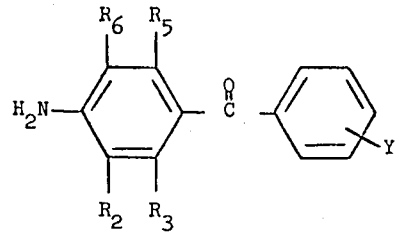

| $R_2$ | $R_3$ | Y | $R_5$ | $R_6$ | Method |
|---|---|---|---|---|---|
| H | H | 4-Br | H | H | I |
| H | H | 4-F | H | H | I |
| H | H | 4-I | H | H | I |
| H | H | 4-CH₃ | H | H | I |
| H | n-C₄H₉ | 4-Cl | H | H | II |
| F | F | H | F | F | II |
| H | OCH₃ | 4-CN | H | H | II |
| H | OCH₃ | H | OCH₃ | H | II |
| H | OCH₃ | 4-Cl | OCH₃ | H | II |
| H | OCH₃ | 2-CH₃ | OCH₃ | H | II |
| H | OCH₃ | 2-NO₂ | OCH₃ | H | II |
| H | OCH₃ | 3-CN | OCH₃ | H | II |
| H | SCH₃ | H | SCH₃ | H | II |
| H | SCH₃ | 2-Br | SCH₃ | H | II |
| H | SCH₃ | 4-Cl | SCH₃ | H | II |
| H | SCH₃ | 4-CH | SCH₃ | H | II |
| H | SC₂H₅ | 4-Cl | SC₂H₅ | H | II |
| F | OCH₃ | H | OCH₃ | F | II |
| F | OCH₃ | 4-F | OCH₃ | F | II |
| F | OCH₃ | 4-CN | OCH₃ | F | II |
| F | OCH₃ | 4-Cl | OCH₃ | F | II |
| F | SCH₃ | 4-CH₃ | SCH₃ | F | II |
| F | OCH₃ | H | OCH₃ | H | II |

PREPARATION C

3-Fluoro-2,6-Dimethoxy-4-Aminobenzophenone

A solution of 2,4dimethoxyacetanilide (0.2 mole) in concentrated sulfuric acid (50 ml.) is cooled to −30°C. and concentrated nitric acid (50 ml.) is rapidly added dropwise. The mixture is allowed to warm to 0°C. then poured into a large volume of ice water layered with ethyl acetate. The acidic reaction mixture is neutralized with solid sodium bicarbonate with rapid stirring. The ethyl acetate layer is separated, washed with water (3 × 100 ml.) and then evaporated to give an oil. The oil is added to dimethoxyethane-hydrochloric acid (1:1), the mixture heated for one hour and the dimethoxyethane then removed under reduced pressure. The residue is layered with methylene chloride and neutralized with solid sodium bicarbonate. The methylene chloride solution is washed with water, followed by brine, and dried ($Na_2SO_4$). Removal of the methylene chloride gives a gummy solid. Fractional recrystallizations from dilute methanol afford the desired product: 2,4-dimethoxy-6-nitroaniline.

Sodium nitrite (0.2 mole) in water (20 ml.) is added to a solution of 2,4-dimethoxy-6-nitroaniline in water (200 ml.) and concentrated hydrochloric acid (75 ml.) at 0°C. The mixture is stirred for one hours, then filtered and the filtrate cooled to 0°C. A solution of sodium tetrafluoroborate (0.2 mole) in water (70 ml.) is added dropwise and, after one-half hour, the diazonium salt collected and dried in vacuo over phosphorous pentoxide. The salt is mixed with ten times its volume of acid washed and ignited sea sand then heated to 170°C. in a distillation apparatus until gas evolution ceases. The mixture is cooled, extracted with ether. The ethereal solution is washed successively with dilute acid, water and brine, then dried ($Na_2SO_4$) and evaporated to give 2-fluoro-3,5-dimethoxynitrobenzene as a crystalline solid.

This product (0.2 mole) is dissolved in absolute ethanol (200 ml.) and stannous chloride dihydrate (0.6 mole) in concentrated hydrochloric acid (110 ml.) added. The resulting solution is stirred at room temperature for five hours then poured into one liter of ice water layered with methylene chloride. The pH is adjusted to 10 with 10 percent aqueous sodium hydroxide and rapid stirring. The methylene chloride layer is separated, washed with water and brine and then dried ($Na_2SO_4$). The product, 2-fluoro-3,5-dimethoxyaniline, is recovered by evaporation and used without further purification.

Acetyl chloride (0.2 mole) is added in portions over a half-hour to a solution of 2-fluoro-3,5-dimethoxyaniline (0.2 mole) in anhydrous methylene chloride (200 ml.) and the solution refluxed overnight. It is evaporated and the residue dissolved in ethyl acetate (300 ml.) and the solution washed successively with water (3 × 100 ml.), dilute hydrochloric acid (3 × 100 ml.), 2 percent aqueous sodium bicarbonate (3 × 100 ml.), water (2 × 100 ml.) and brine (3 × 100 ml.), then dried ($Na_2SO_4$). Removal of the solvent provides the product.

It is converted to 3-fluoro-2,6-dimethoxy-4-aminobenzophenone by method II of preparation B.

PREPARATION D 2,6-Dimethoxy-3,5-Difluoro-4-Aminobenzophenone

Trifluoroxytrifluoromethane (0.20 mole) is added portionwise to a stirred solution of 2,6-dimethoxy-4-aminobenzophenone (0.10 mole) in dry chloroform (200 ml.) at 0°C. The mixture is stirred at 0°C. for 1 hour and then diluted with water. The chloroform phase is separated, washed successively with water (3 × 100 ml.), 2 percent aqueous sodium bicarbonate (3 × 100 ml.), water (3 × 100 ml.) and saturated brine (3 × 100 ml.) and then dried ($Na_2SO_4$). Removal of the chloroform in vacuo gives the product as a light solid which recrystallized from dilute methanol.

By means of this procedure and those of Preparations B-C, the following compounds are prepared from appropriate reactants:

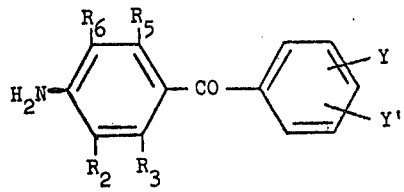

| $R_2$ | $R_3$ | $R_5$ | $R_6$ | Y | Y' | Method |
|---|---|---|---|---|---|---|
| F | $OCH_3$ | $OCH_3$ | F | H | 4-F | D |
| F | $OCH_3$ | $OCH_3$ | F | H | 4-CN | D |
| F | $OCH_3$ | $OCH_3$ | F | H | 4-Cl | D |
| F | $SCH_3$ | $SCH_3$ | F | H | 4-$CH_3$ | D |
| F | $SCH_3$ | $SCH_3$ | F | H | 2-Cl | D |
| F | $OCH_3$ | $OCH_3$ | H | 3-$CH_3$ | 5-$CH_3$ | C |
| F | $OCH_3$ | $OCH_3$ | F | 2-Cl | 4-Cl | D |
| F | $SCH_3$ | $SCH_3$ | F | 2-Cl | 4-Cl | D |
| F | $OCH_3$ | $OCH_3$ | F | 3-$CH_3$ | 4-$CH_3$ | D |
| F | $OCH_3$ | $OCH_3$ | H | 2-Br | 4-Br | C |
| H | H | H | H | 4-$CH_3$ | 2-Cl | B-I |
| H | H | H | H | 2-$OCH_3$ | 4-Cl | B-II |
| H | $CH_3$ | $CH_3$ | F | 2-$OCH_3$ | 4-$OCH_3$ | D |
| F | $CH_3$ | $CH_3$ | F | 2-n-$C_3H_7$ | 4-I | D |

PREPARATION E 2,6-Ditrifluoromethyl-4-Amino-4'-Methoxybenzophenone

A solution of 2,6-ditrifluoromethyl-4-nitroaniline (0.2 mole) in 60 percent $H_2SO_4$ (150 ml.) is treated with sodium nitrite (0.2 mole) at 0°C. in an ice bath. After one hour of stirring at 0°C., a slurry of cuprous cyanide (0.3 mole) in water is added with strong cooling. The reaction is stirred at 0°C. for one-half hour and then heated on a steam bath for ten minutes. The reaction is then extracted with ether and the combined extracts (500 ml.) were washed with water (4 × 200 ml.), saturated brine (3 × 200 ml.) and dried over anhydrous sodium sulfate. Removal of solvent at reduced pressure affords a solid which is recrystallized from methylene chloride/hexane to give 2,6-ditrifluoromethyl-4-nitrobenzonitrile.

A solution of 2,6-ditrifluoromethyl-4-nitrobenzonitrile (0.2 mole) in ethylene glycol (200 ml.) is heated to 190°C. with potassium hydroxide (0.4 mole) for 6 hours. After cooling to room temperature the reaction mixture is diluted with one liter of water and acidified to pH 1.0 with concentrated hydrochloric acid. The mixture is extracted with ethyl acetate and the combined extracts washed with water and saturated brine and dried over anhydrous sodium sulfate. Removal of solvent at reduced pressure affords a brown solid which is recrystallized from methanol.

A solution of the thus-produced 2,6-ditrifluoromethyl-4-nitrobenzoic acid (0.2 mole) in methylene chloride (500 ml.) is refluxed overnight with purified thionyl chloride (0.3 mole). The solvent and excess thionyl chloride are removed under reduced pressure affording the acid chloride which is used directly in the next step.

All apparatus is flame dried before use and the reaction is run in a dry nitrogen atmosphere. A slurry of anhydrous aluminum chloride (0.6 in dry anisole (2.0 mole) is cooled to 0°C. Next, 2,6-ditrifluoromethyl-4-nitrobenzoyl chloride (0.2 mole) is added slowly with rapid stirring and the resulting solution is heated to 100°C. for 4 hours. The reaction is cooled and poured onto rapidly stirred ice water which is layered with ethyl acetate. The ethyl acetate solution is washed with water and concentrated at reduced pressure. The residue is dissolved in dimethoxyethane-hydrochloric acid (400 ml. of 1:1) and heated on a steam bath for 1 hour. The dimethoxyethane is removed at reduced pressure and the residue layered with ethyl acetate. The acid is neutralized with solid sodium bicarbonate with rapid stirring. The ethyl acetate solution is washed with 2 percent aqueous sodium bicarbonate, water and saturated brine and dried over anhydrous sodium sulfate. Removal of solvent at reduced pressure provides solid 2,6-ditrifluoromethyl-4-nitro-4°-methoxybenzophenone which is reduced to the amine by the stannous chloride procedure of preparation C.

The following compounds are prepared in like manner:

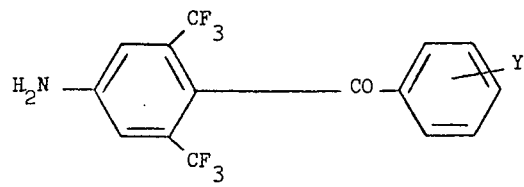

Y = 4-Cl, 2-$CH_3$, 3-CN, 4-F

These products and those of Preparations B, C and D are reduced to the corresponding alcohols by the methods of Example IX. The alcohols and precursor ketones are converted via the procedure of Example I to as-triazines.

PREPARATION F

2,6-Dithiocyano-4-Aminobenzophenone

A solution of 4-acetamidobenzoic acid (0.2 mole) in concentrated sulfuric acid (50 ml.) is cooled to 0°C. in an ice bath and treated with concentrated nitric acid (100 ml.). The reaction is allowed to warm slowly to room temperature and held there for one-half hour. The reaction mixture is then poured slowly into ethyl acetate. The ethyl acetate solution is washed with water (10 × 100 ml.) and saturated brine (3 × 100 ml.) and dried over anhydrous sodium sulfate. Removal of solvent at reduced pressure gives the desired 3,5-dinitro-4-acetamidobenzoic acid.

A solution of the dinitro compound (0.2 mole) in ethyl acetate (200 ml.) is hydrogenated for two hours under 50 psi of hydrogen using 1.5 g. of 10 percent Pd/C catalyst. The catalyst is removed by filtration through a super-cell pad and washed with ethyl acetate. Removal of the solvent from the filtrate affords 3,5-diamino-4-acetamidobenzoic acid as a white solid.

To concentrated nitric acid (100 ml.) cooled to 0° C. is added 3,5-diamino-4-acetamidobenzoic acid (0.2 mole) portionwise.

After addition is complete the reaction is stirred for five minutes and then poured onto one liter of ice water layered with ethyl acetate. The resulting ethyl acetate solution is washed with water and saturated brine and dried over anhydrous sodium sulfate. Removal of solvent gives 2,5-dinitro-3,5-diamino-4-acetamidobenzoic acid as a yellow crystalline solid. This is used in the next reaction after recrystallization from dilute methanol.

To a cooled solution of 2,6-dinitro-3,5-diamino-4-acetamidobenzoic acid (0.20 mole) in hypophosphorous acid (300 ml.) is added sodium nitrite (0.44 mole) in water (50 ml.) slowly below the surface of the liquid. After 1 hour at 0°C., the reaction is extracted well with ethyl acetate. The combined extracts are washed well with water and saturated brine and dried over anhydrous sodium sulfate. Removal of solvent at reduced pressure gives 2,6-dinitro-4-acetamidobenzoic acid, a yellow solid, which is recrystallized from methylene chloride/hexane.

It is reduced to 2,6-diamino-4-acetamidobenzoic acid by the procedure described above for the 3,5-diamino isomer.

To a cooled solution of 2,6-diamino-4-acetamidobenzoic acid (0.01 mole) in 60 percent sulfuric acid (70 ml.) is added slowly beneath the surface of the liquid sodium nitrite (0.022 mole) in water (10 ml.). After 1 hour at 0°C., the diazotized mixture is poured slowly onto a slurry of cuprous thiocyanate (0.02 mole) and potassium thiocyanate (0.02 mole) in water (100 ml.). The reaction is heated with rapid stirring on a steam bath for one hour and the resulting pasty mass extracted with several portions of hot benzene. The combined benzene extracts are washed well with water and saturated brine and dried over anhydrous sodium sulfate. Removal of solvent at reduced pressure gives a pasty solid which is recrystallized from ether/hexane to give 2,6-dithiocyano-4-acetamidobenzoic acid as white needles.

A solution of 2,6-dithiocyano-4-acetamidobenzoic acid (0.12 mole) in methylene chloride (250 ml.) and of purified thionyl chloride (0.24 mole) is refluxed overnight. Solvent and excess thionyl chloride are removed at reduced pressure leaving the acid chloride as a yellow oil which is used directly in the next reaction.

All apparatus is flame dried and placed under a dry nitrogen atmosphere before use. To a slurry of benzene (100 ml.) and anhydrous aluminum chloride (0.36 mole) cooled to 0°C. is added 2,6-dithiocyano-4-acetamidobenzoyl chloride (0.12 mole) slowly. The dark solution which results is heated at 100°C. for 6 hours, and then cooled and poured onto 1 liter of ice water layered with ethyl acetate. The ethyl acetate solution is washed once with water and evaporated to dryness. The residue is dissolved in dimethoxyethane-hydrochloric acid (1:1, 500 ml.) and heated on a steam bath for 2 hours. The dimethoxyethane is then removed at reduced pressure, the residue layered with methylene chloride and neutralized with solid sodium bicarbonate. The methylene chloride solution is then washed well with 2 percent aqueous sodium bicarbonate, water and saturated brine and dried ($Na_2SO_4$). Removal of solvent at reduced pressure gives a brown solid which is recrystallized from methanol to give the title product.

Repetition of this procedure but using cuprous cyanide and potassium cyanide in place of cuprous thiocyanate and potassium thiocyanate affords 2,6-dicyano-4-aminobenzophenone.

The following compounds are prepared using the appropriately substituted benzene derivative in place of benzene:

3,912,723

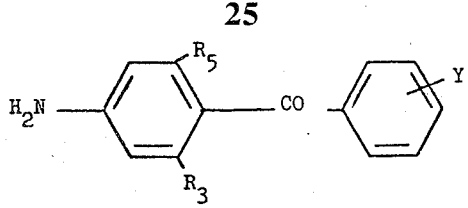

| $R_3=R_5$ | Y | $R_3=R_5$ | Y |
|---|---|---|---|
| SCN | 4-CH₃ | CN | 4-t-C₄H₉ |
| SCN | 4-Cl | CN | 2-CH₃ |
| SCN | 3-CN | CN | 2-Cl |
| SCN | 4-OCH₃ | CN | 4-F |
| SCN | 4-i-C₃H₇ | CN | 4-OC₂H₅ |

PREPARATION G

2,4'-Dichloro-4-Nitrodiphenylamine

A mixture of p-chloroaniline (18.6 g., 0.3 moles), 3,4-dichloronitrobenzene (19.2 g., 0.1 mole), anhydrous potassiumcarbonate (15.1 g., 0.11 moles), copper oxide (1.0 g.) and N,N-dimethylformamide (100 ml.) is refluxed for 18 hours. Additional copper oxide (1.0 g.) is added and the mixture refluxed for an additional 20 hours. It is then cooled, filtered and the filtrate slowly poured into 6N hydrochloric acid (800 ml.). After stirring for 40 minutes, the precipitate is collected by filtration, washed with water (3 × 1 liter) and dried (21.5 g.). The product is purified by steam distillation to remove unreacted 3,4-dichloronitrobenzene. The residue remaining after steam distillation is thoroughly mixed with 600 ml. of chloroformethylene chloride (9-1) and the layers allowed to separate. The organic phase is separated, decolorized and dried over anhydrous sodium sulphate. Removal of the solvent provides the desired product. Further purification is achieved by recrystallizing the product from acetonitrile. The product melts at 130°-132°C.

It is reduced to the corresponding aniline derivative by the stannous chloride procedure of Preparation C then converted to 2-[3-chloro-4-(4-chlorophenylamino)phenyl]-as-triazine-3,5(2H,4H) dione by the procedure of Example I.

The following amines are prepared in like manner from appropriate materials and then converted to 2-phenyl-as-triazine-3,5(2H,4H) diones by the method of Example I.

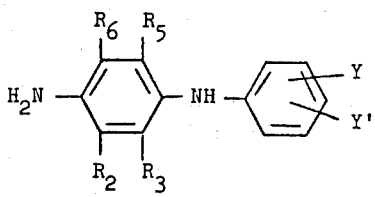

| $R_2$ | $R_3$ | $R_5$ | $R_6$ | Y | Y' |
|---|---|---|---|---|---|
| H | H | H | H | H | 4-Cl |
| H | H | H | H | H | 4-Br |
| H | Cl | H | H | H | 4-I |
| H | H | H | H | H | 4-F |
| H | H | H | H | 2-Br | 5-n-C₄H₉ |

-Continued

| $R_2$ | $R_3$ | $R_5$ | $R_6$ | Y | Y' |
|---|---|---|---|---|---|
| H | H | H | H | 4-OC₄H₉ | 2-C₂H₅ |
| H | Cl | H | H | 4-OCH₃ | H |
| H | Cl | H | H | 4-OC₄H₉ | H |
| H | H | H | H | 3-Cl | 4-Cl |
| H | H | H | H | 3-OCH₃ | 4-OCH₃ |
| H | Cl | H | H | H | 4-CN |
| H | H | H | H | H | 2-CN |
| H | H | H | H | 4-Cl | 2-C₂H₅ |
| H | H | H | H | 3-Cl | 4-Br |
| H | H | H | H | 2-Cl | 5-CN |
| H | H | H | H | 2-Br | 3-NO₂ |
| H | H | H | H | 2-Cl | 4-Cl |
| H | H | H | H | H | H |
| H | OC₃H₇ | OC₃H₇ | H | H | Cl |
| H | Cl | H | H | 2-t-C₄H₉ | 4-t-C₄H₉ |
| H | CH₃ | CH₃ | H | 4-Cl | H |
| H | C₂H₅ | C₂H₅ | H | 4-Cl | H |
| H | CH₃ | CH₃ | H | 4-Br | H |
| H | Cl | Cl | H | 4-Cl | H |
| H | Br | Br | H | 4-Cl | H |
| H | Cl | Cl | H | 4-Br | H |
| H | CH₃ | Cl | H | 4-Cl | H |
| H | CH₃ | Cl | H | 2-Cl | 4-Cl |
| H | CH₃ | CH₃ | H | 2-CH₃ | 4-Br |
| H | CH₃ | H | H | 2-(i-C₃H₇) | 4-Cl |

PREPARATION H

N-(2,6-Dichloro-4-Aminophenyl)Morpholine

N-(2,6-Dichloro-4-Nitrophenyl)Morpholine

A mixture of morpholine (7.7 g., 0.885 mole) and 3,4,5-trichloronitrobenzene (20.0 g., 0.885 mole) is heated at 95°C. for 43 hours, then cooled to room temperature. The entire reaction mixture is poured into 6N hydrochloric acid (500 ml.) and stirred for one-half hour. The dark solid which precipitates is collected by filtration (22.0 g.). It is purified by recrystallization from ethanol (250 ml.) with a decolorizing treatment. Yield = 10.0 g. Melting point 116°-118°C.

Reduction of the Nitro to an Amino Group

A solution of stannous chloride dihydrate (33.0 g., 0.14 mole) in concentrated hydrochloric acid (65 ml.) is added in one portion to a stirred slurry of the nitro derivative (10.0 g.), prepared as described above, in ethanol (65 ml.) and the mixture refluxed for 20 minutes. The mixture is then cooled and the solid product collected by filtration, washed with water, and dried. The dried solid is slurried with a mixture of chloroform (400 ml.) and water (100 ml.), then made basic with a 10 percent aqueous sodium hydrochloride solution. The mixture is filtered, the chloroform layer separated, washed with water (2 × 100 ml.), decolorized with charcoal and dried over anhydrous sodium sulphate. Removal of the chloroform under reduced pressure gives the product (5.0 g.) as a fluffy solid. It is purified by recrystallization from ethanol. Melting point 175°-176°C.

In like manner, the following compounds are prepared:

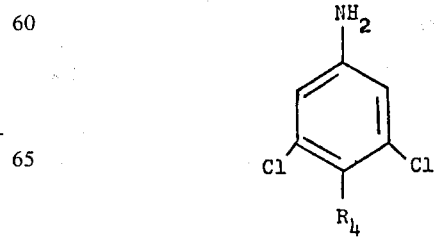

| $R_4$ | $R_4$ |
|---|---|
| $N(CH_3)_2$ | thiomorpholino |
| $N(C_2H_5)_2$ | piperazino |
| $N(C_3H_7)_2$ | pyrrolo |
| $N(i-C_3H_7)_2$ | pyrrolino |
| $N(C_4H_9)_2$ | pyrrolidino |
| $N(t-C_4H_9)_2$ | piperidino |
| $N(CH_3)(C_4H_9)$ | thiazolidino |
| $N(CH_3)(C_2H_5)$ | hexamethyleneimino |
| $\Delta^3$-tetrahydropyridino | N-methylpiperazino |
| N-(n-butyl)piperazino | |

The aniline derivatives thus prepared are converted to 2-phenyl-as-triazine-3,5(2H,4H) diones by the procedure of Example I.

What is claimed is:

1. A compound having the formula

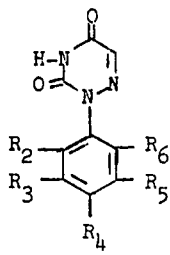

and the alkali metal and alkaline earth metal salts thereof wherein each of $R_2$ and $R_6$ is selected from the group consisting of hydrogen, fluoro, chloro, cyano and methyl; with the proviso that at least one of $R_2$ and $R_6$ is hydrogen or fluoro;

each of $R_3$, $R_4$ and $R_5$ is selected from the group consisting of a first sub-group consisting of hydrogen, cyano, trifluoromethyl, halogen and lower alkyl; a second sub-group consisting of lower alkoxy and lower alkylthio; a third sub-group consisting of nitro and thiocyanate; with the proviso that when at least one of $R_3$ and $R_5$ is selected from the second sub-group, $R_4$ is selected from the first and third sub-groups; and only one of $R_3$ and $R_5$ is hydrogen.

2. A compound having the formula:

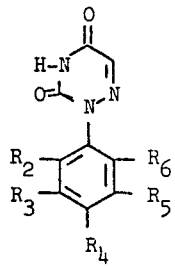

and the alkali metal and alkaline earth metal salts thereof wherein each of $R_2$ and $R_6$ is selected from the group consisting of hydrogen, fluoro, chloro, cyano and methyl; with the proviso that at least one of $R_2$ and $R_6$ is hydrogen or fluoro;

each of $R_3$ and $R_5$ is selected from the group consisting of a first sub-group consisting of hydrogen, cyano, trifluoromethyl, halogen and lower alkyl; a second sub-group consisting of lower alkoxy and lower alkylthio; a third sub-group consisting of nitro and thiocyanato;

$R_4$ is selected from the group consisting of $-NR_7R_8$, lower alkanoyl, alkyl sulfonyl, $SO_2NRR_1$ and

with the proviso that when $R_4$ is $SO_2NRR_1$ or lower alkanoyl, at least one of $R_3$ and $R_5$ is other than hydrogen;

R is selected from the group consisting of methyl, ethyl, phenyl, benzyl, allyl, propargyl and p-chlorophenyl;

$R_1$ is selected from the group consisting of methyl, ethyl, allyl and propargyl;

R and $R_1$ when taken together with the nitrogen to which they are attached are selected from the group consisting of pyrrolo, pyrrolino, pyrrolidino, piperidino, N-(lower alkyl)piperazino, hexamethyleneimino, 3,4-dichloropiperidino, thiazolidino, and $\Delta^3$-tetrahydropyridino and piperazino;

each of $R_7$ and $R_8$ is selected from the group consisting of lower alkyl of from 1 to 4 carbon atoms; $R_7$ and $R_8$ when taken together with the nitrogen atom to which they are attached are selected from the group consisting of pyrrolo, pyrrolino, pyrrolidino, piperidino, N-(lower alkyl)piperazino, hexamethyleneimino, thiazolidino, $\Delta^3$-tetrahydropyridino and piperazino;

X is selected from the group consisting of oxygen, sulfur, $>C=O$, $=NH$, $-S \rightarrow O$, $-SO_2-$, and $-CHOH-$;

each of Y and Y' is selected from the group consisting of hydrogen, nitro, cyano, halogen, lower alkyl and lower alkoxy;

provided that where $R_3$ or $R_5$ is methyl or chloro and X is sulfur, $-SO_2-$, or $>C=O$, then $R_4$ is other than

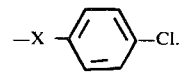

3. A compound according to claim 1 wherein each of $R_2$, $R_5$, and $R_6$ is hydrogen; and each of $R_3$ and $R_4$ is selected from the first sub-group.

4. A compound according to claim 2 wherein each of $R_2$ and $R_6$ is hydrogen; and each of $R_3$, $R_4$ and $R_5$ is selected from the first sub-group.

5. A compound according to claim 2 wherein $R_4$ is $SO_2NRR_1$, said compound having the formula:

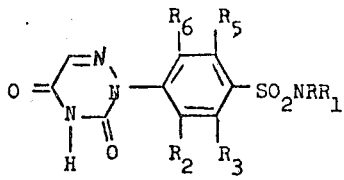

6. A compound according to claim 2 wherein $R_4$ is

said compound having the formula:

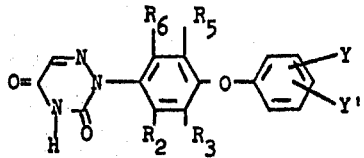

7. A compound according to claim 2 wherein R$_4$ is

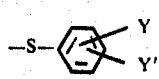

said compound having the formula:

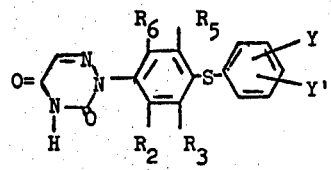

8. A compound according to claim 2 wherein R$_4$ is

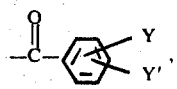

said compound having the formula:

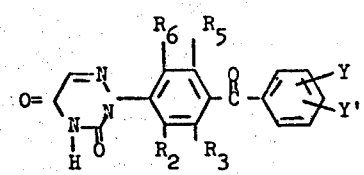

9. A compound according to claim 2 wherein R$_4$ is

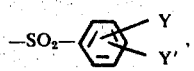

said compound having the formula:

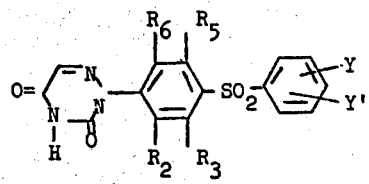

10. A compound according to claim 2 wherein R$_4$ is

said compound having the formula

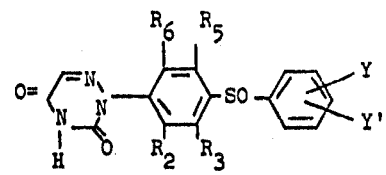

11. A compound according to claim 2 wherein R$_4$ is

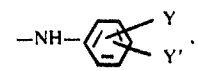

said compound having the formula:

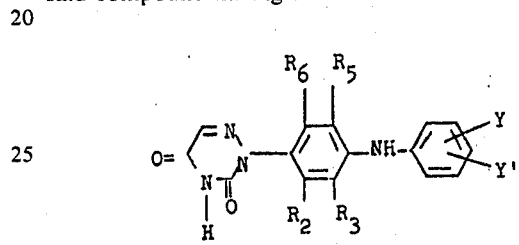

12. A compound according to claim 6 wherein each of R$_2$, R$_6$ and Y is hydrogen; each of R$_3$ and R$_5$ is selected from the first sub-group and Y' is halogen.

13. A compound according to claim 6 wherein each of R$_2$ and R$_6$ is hydrogen; each of R$_3$ and R$_5$ is selected from the first sub-group; Y is halogen and Y' is lower alkyl.

14. A compound according to claim 7 wherein each of R$_2$, R$_6$ and Y is hydrogen, each of R$_3$ and R$_5$ is selected from the first sub-group; and Y' is halogen.

15. A compound according to claim 8 wherein each of R$_2$, R$_6$ and Y is hydrogen, each of R$_3$ and R$_5$ is selected from the first sub-group; and Y' is halogen.

16. A compound according to claim 8 wherein each of R$_2$ and R$_6$ is hydrogen; each of R$_3$ and R$_5$ is selected from the first sub-group; Y is halogen; and Y' is lower alkyl.

17. A compound according to claim 9 wherein each of R$_2$, R$_6$ and Y is hydrogen; each of R$_3$ and R$_5$ is selected from the first sub-group; and Y' is halogen.

18. A compound according to claim 12 wherein each of R$_2$, R$_5$, R$_6$ and Y is hydrogen; R$_3$ is chloro; and Y' is 4-bromo, said compound having the formula:

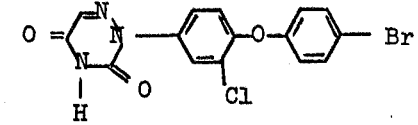

19. A compound according to claim 12 wherein each of R$_2$, R$_5$, R$_6$ and Y is hydrogen; R$_3$ is methyl; and Y' is 4-chloro, said compound having the formula:

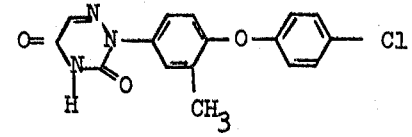

20. A compound according to claim 13 wherein each of $R_2$, $R_5$ and $R_6$ is hydrogen; $R_3$ is chloro; Y' is 3-ethyl; and Y is chloro, said compound having the formula:
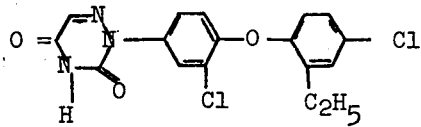
21. A compound according to claim 16 wherein each of $R_2$, $R_5$ and $R_6$ is hydrogen; $R_3$ is chloro; Y is 4-bromo; and Y' is 2-methyl, said compound having the formula
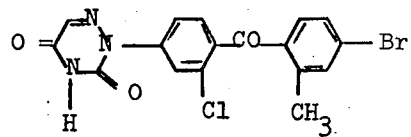
* * * * *